(12) United States Patent
Murakami et al.

(10) Patent No.: US 6,577,804 B2
(45) Date of Patent: Jun. 10, 2003

(54) SHEATHED OPTICAL FIBER CUTTING METHOD AND APPARATUS

(75) Inventors: Akihiro Murakami, Tokyo (JP); Takanobu Yamazaki, Tokyo (JP); Toshihiro Mikami, Tokyo (JP); Xu Jie, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/108,951

(22) Filed: Mar. 26, 2002

(65) Prior Publication Data

US 2002/0100356 A1 Aug. 1, 2002

Related U.S. Application Data

(63) Continuation of application No. PCT/JP01/06443, filed on Jul. 26, 2001.

(30) Foreign Application Priority Data

Jul. 27, 2000 (JP) .......................................... 2000-226768
Jun. 28, 2001 (JP) .......................................... 2001-197191

(51) Int. Cl.$^7$ ............................ G02B 6/00; B21F 13/00; B26F 3/00

(52) U.S. Cl. ........................... 385/147; 30/90.1; 83/947; 225/96

(58) Field of Search ................................ 385/147, 134, 385/135, 136, 137; 83/947; 30/90.1, 91.2; 225/96, 96.5

(56) References Cited

U.S. PATENT DOCUMENTS

| | | | | |
|---|---|---|---|---|
| 4,203,539 A | * | 5/1980 | Miller | 225/2 |
| 4,216,004 A | * | 8/1980 | Brehm et al. | 225/96.5 |
| 4,530,452 A | | 7/1985 | Balyasny et al. | 225/96 |
| 5,048,908 A | * | 9/1991 | Blonder et al. | 385/39 |
| 5,188,268 A | * | 2/1993 | Hakoun et al. | 225/96.5 |
| 5,368,211 A | * | 11/1994 | Michel et al. | 225/96.5 |

\* cited by examiner

*Primary Examiner*—Michael C. Zarroli
(74) *Attorney, Agent, or Firm*—Knobbe, Martens, Olson & Bear, LLP

(57) ABSTRACT

A sheathed optical fiber cutting method and apparatus for cutting the sheathed optical fiber. In one embodiment, the sheathed optical fiber is rotated around its center axis against a cutting blade. An incision is made in an area of the sheathed optical fiber that is under tension from being bent. The incision makes a cut that is flat and perpendicular to the axis of the optical fiber. In one embodiment, the blade for making the incision is mounted in a vibration generator.

9 Claims, 14 Drawing Sheets

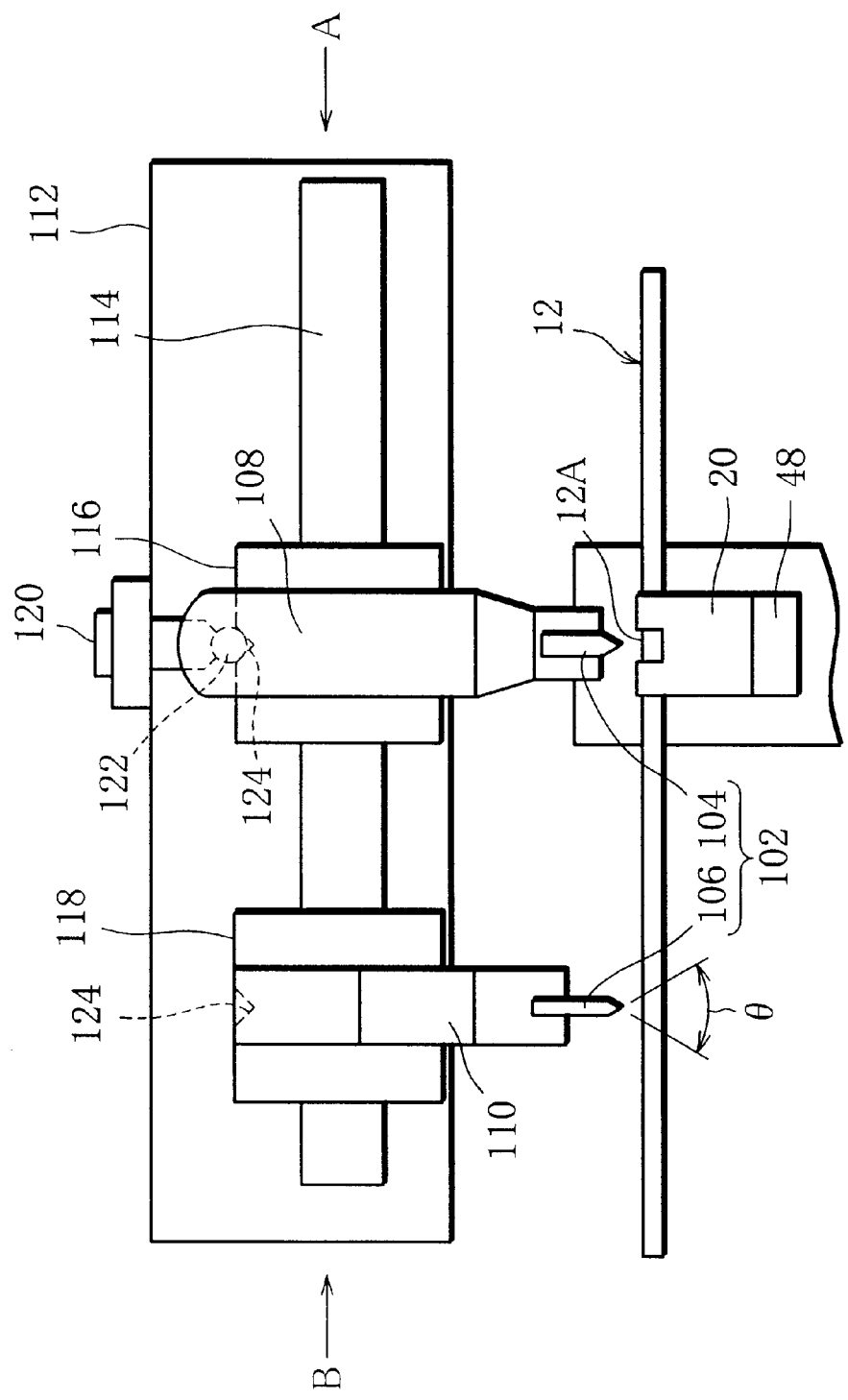

PRIOR ART

PRIOR ART

SHEATHED OPTICAL FIBER CUTTING METHOD AND APPARATUS

RELATED APPLICATION

This application is a continuation of PCT/JP01/06443, filed Jul. 26, 2001, and incorporates it by reference in its entirety.

TECHNICAL FIELD

The present invention relates to a sheathed optical fiber cutting method and apparatus.

BACKGROUND ART

There are sheathed optical fibers that are drawn from an optical fiber mother material and have a sheath on an optical fiber (bare fiber bearing no coat on its outer surface) made of a core and a clad. It is necessary to cut such a sheathed optical fiber as follows in one step in order to efficiently and accurately measure the decentering of the sheath and mode fields such as the refractive index distribution. Namely, a sheathed optical fiber needs cutting so that no step is left between the sheath and the optical fiber as well as its sheared edge is perpendicular to the axial direction.

The prior art cutting apparatus for sheathed optical fibers meeting the above needs holds the sheathed optical fiber 1 having an optical fiber 1a and a sheath 1b with right and left clamps 2 and 3, as shown in FIG. 15, for example. A cutting blade 4 that slides between the clamps 2 and 3 is pushed onto the sheathed optical fiber 1 to make an incision in the fiber. Afterward, a block 5 facing the cutting blade 4 pushes the sheathed optical fiber 1 to cut the sheathed optical fiber 1.

In this type of cutting apparatuses, the cutting blade 4 may cut the sheathed optical fiber 1, with the sheathed optical fiber 1 being held by the right and left clamps 2 and 3 and provided with tension in its longitudinal direction. In other cases, after the right and left clamps 2 and 3 have clamped the sheathed optical fiber 1, either clamp moves away from the other, and then the sheathed optical fiber 1 is cut, being provided with tension.

Meanwhile, there are proposed cutting apparatuses like those shown in FIGS. 16A and 16B that can cut a sheathed optical fiber without leaving a step between its sheath and optical fiber to provide a flat sheared edge perpendicular to the axial direction.

Such cutting apparatuses hold the sheath 1b at the end of the sheathed optical fiber 1 with the clamp 3 and the optical fiber 1a from which the sheath 1b has been removed with the clamp 2, respectively. The optical fiber 1a is cut by the cutting blade 4 between the clamps 2 and 3. The clamp 3 fixing the sheath 1b has an elastic body 6 such as a spring that repels to the opposite direction to the cutting blade 4 to provide the sheathed optical fiber 1 with constant tension.

These cutting apparatuses further have, between the clamp 3 and the cutting blade 4, tension providing means 9 having a slope 7 and an index plunger 8. The slope 7 is formed on the clamp 3 so that it gradually increases the tension applied to the sheathed optical fiber 1 after an incision is made on the sheathed optical fiber 1 by sliding the cutting blade 4 until the sheathed optical fiber is cut. The index plunger 8 is mounted on the side of the cutting blade 4 and its end is pushed against the slope 7.

However, in the cutting apparatus shown in FIG. 15, compressive stress is applied to the sheath because the edge of the cutting blade 4 digs into the incision made in the sheath of the sheathed optical fiber 1 during the cutting of the sheathed optical fiber 1. As a result, the sheath is likely to collapse when employing this type of cutting apparatuses, and the edge of the cutting blade 4 often slips off the sheath because of the elasticity of the sheath. Besides, because the cutting blade 4 digs into the sheathed optical fiber 1 from a single direction, the sheath is torn during cut and the cutting of the optical fiber inside the sheath is affected.

Therefore, using the cutting apparatus shown in FIG. 15, it is difficult to cut the sheathed optical fiber 1, leaving no step between the sheath and the optical fiber, and to provide a flat sheared edge perpendicular to the axial direction.

Meanwhile, the cutting apparatuses shown in FIGS. 16A and 16B remove the sheath 1b of the sheathed optical fiber 1 and then cut only the optical fiber 1a. Those cutting apparatuses thus need a preliminary process for removing the sheath 1b prior to cutting, requiring two steps for cutting the sheathed optical fiber 1.

An object of the present invention is to provide a sheathed optical fiber cutting method and apparatus that can cut sheathed optical fibers, leaving no step between the sheath and the optical fiber, and provide a flat sheared edge perpendicular to the axial direction in a single step.

DISCLOSURE OF THE INVENTION

In order to solve the above problems, a sheathed optical fiber cutting method based on a first aspect of the present invention is constituted in such a manner that an incision is made by a cutting blade, under such a condition that the sheathed optical fiber is relatively rotated around its center axis against the cutting blade and bent, in an area having a bent curvature larger than that of the center of the bent optical fiber along the center axis, from the tension-applied surface to which a tension is applied due to fiber bending toward the fiber center, and the sheathed optical fiber is cut.

In the sheathed optical fiber cutting method based on the first aspect, the sheathed optical fiber cutting method based on a second aspect of the present invention is constituted in such a manner that the sheath of the sheathed optical fiber is sheared and then the optical fiber where a cutout has been made is cut.

Further in the sheathed optical fiber cutting method based on the first aspect, the sheathed optical fiber cutting method based on a third aspect of the present invention is constituted in such a manner that the cutting blade makes the incision in the tension-applied surface under such a condition that the sheathed optical fiber is pulled along its axial direction.

A sheathed optical fiber cutting apparatus based on a fourth aspect of the present invention comprises: a clamp part that holds the sheathed optical fiber; a cutting blade that makes an incision toward the center of the sheathed optical fiber; a blade block that is located against the cutting blade beyond the sheathed optical fiber and supports the sheathed optical fiber where an incision is to be made by the cutting blade; tension providing means for forming in the sheathed optical fiber a tension-applied surface to which a tension due to fiber bending is applied by pushing and bending the blade block onto the sheathed optical fiber and having a mechanism of relatively pushing the tension-applied surface onto the cutting blade; and rotating means for relatively rotating the sheathed optical fiber around its center axis against the cutting blade.

The sheathed optical fiber cutting apparatus based on a fifth aspect of the invention is the sheathed optical fiber cutting apparatus based on the fourth aspect of the invention, wherein the tension providing means further has a tension providing mechanism for providing additional tension to the tension-applied surface of the sheathed optical fiber by pulling the sheathed optical fiber to its axial direction in order to gradually increase the tension applied to the sheathed optical fiber as the incision made by the cutting blade becomes deeper.

The sheathed optical fiber cutting apparatus based on a sixth aspect of the invention is the sheathed optical fiber cutting apparatus based on the fourth or fifth aspect of the invention, wherein the cutting blade is mounted in vibration generating means for vibrating in a radial direction of the sheathed optical fiber.

The sheathed optical fiber cutting apparatus based on a seventh aspect of the invention is the sheathed optical fiber cutting apparatus based on the fourth, fifth or sixth aspect of the invention, wherein; the cutting blade comprises a first cutting blade for cutting the sheath of the sheathed optical fiber and a second cutting blade for cutting the optical fiber, and the first and second cutting blades are mounted in a cutting blade exchange guide so that they may shuttle between an operation position for cutting the sheath of the sheathed optical fiber or the optical fiber and a position for standby.

According to the sheathed optical fiber cutting methods and cutting apparatus based on the first, second and fourth aspects of the present invention, a cutting blade makes an incision in an area having a bent curvature larger than that of the center line of the bent fiber along the optical axis, from a tension-applied surface to which a tension is applied by the bending of the sheathed optical fiber toward the fiber center, holding the sheathed optical fiber in a curved state. Then the incision created in the sheathed optical fiber broadens from the fiber center side toward the outside radial direction to the tension-applied surface, seen from the transverse direction perpendicular to the optical axis. Therefore, the contact friction between the cutting blade and the incision in the sheathed optical fiber as well as the compression stress exerted on the sheath of the sheathed optical fiber and the optical fiber become small. As a result, the sheath of the sheathed optical fiber near the incision does not collapse, or the sheared edge of the sheath or the optical fiber does not become rough. Furthermore, the edge of the cutting blade does not slip away from the sheath because of the elasticity of the sheath of the sheathed optical fiber.

Further, according to the sheathed optical fiber cutting method of the present invention, the cutting blade makes an incision in the tension-applied surface of the sheathed optical fiber by relatively rotating the sheathed optical fiber around its center axis against the cutting blade. Therefore, the incision develops uniformly in the outer surface in the circumferential direction, eliminating the problem that when cutting a sheathed optical fiber the sheath is torn off and the sheared edge becomes uneven (rough).

Thus it is possible to cut the sheathed optical fiber so that the sheared edge is flat and perpendicular to the axial direction in a single step, leaving no step between the sheath and the optical fiber. It also becomes possible to accurately measure the decentering of the sheath of the sheathed optical fiber and the mode fields such as the refractive index distribution efficiently and accurately in a single step.

Further, the sheath of the sheathed optical fiber is sheared at an incision made by the cutting blade and then the optical fiber is sheared after a cutout has been made. Therefore, the sheared edge of the sheath becomes flat and the fracture edge of the optical fiber becomes mirror-flat. Therefore, it becomes possible to easily and quickly perform after-treatment like edge polishing; it may be possible to skip after-treatment.

According to the sheathed optical fiber cutting method and cutting apparatus based on the third and fifth aspects of the present invention, the sheathed optical fiber is relatively rotated around its center axis against a cutting blade, curved and pulled along its axial direction at the same time. In this state, the cutting blade makes an incision in an area having a bent curvature larger than that of the center of the bent fiber along the center axis, from the tension-applied surface to the fiber center, to cut the optical fiber. Thus the sheathed optical fiber does not require bending strongly with a small curvature. In other words, it is possible to form an outer surface to which a tension is applied due to fiber bending by gently curving the sheathed optical fiber with a large radius of curvature. When the sheathed optical fiber is bent, while being relatively rotated around its center axis against the cutting blade, no excessive torsion is applied to the sheathed optical fiber and thus there is no damage caused to the optical fiber. At the same time, since it becomes easy to relatively rotate and bend the optical fiber, the structure of the cutting apparatus becomes simple.

If the cutting blade makes an incision in the tension-applied surface under such a condition that the sheathed optical fiber is relatively rotated and bent as well as pulled in the axial direction at the same time, the tension applied to the optical fiber gradually increases as the incision made by the cutting blade develops deep. As a result, since the incision in the sheathed optical fiber made by the cutting blade easily widens, the contact friction between the cutting blade and the incision becomes smaller. So, it is preferable that, it becomes possible to make the sheared edges, made by the cutting blade, of the sheath and the optical fiber of the sheathed optical fiber easily flat.

According to the sheathed optical fiber cutting apparatus based on the sixth aspect of the present invention, the cutting blade is mounted on the vibration generating means that vibrates in the radial direction of the sheathed optical fiber. In such a cutting apparatus, since the friction exerted on the contact face between the cutting blade and the sheathed optical fiber becomes smaller when cutting the sheathed optical fiber through making an incision with the cutting blade, it is ensured to provide a flatter sheared edge.

According to the sheathed optical fiber cutting apparatus based on the seventh aspect of the present invention, a first cutting blade for cutting the sheath of the sheathed optical fiber and a second cutting blade for cutting the optical fiber are prepared as cutting blades, and these cutting blades are exchanged to serve cutting corresponding to the target, namely, sheath or optical fiber. Since it is possible to cut the sheath and the optical fiber under almost ideal condition that fits the used materials, the sheared edge of the sheathed optical fiber is relatively easily made flat with reliability. Further, since the durability of the cutting blades is improved, the life of the cutting blade is extended, and the interval for replacing the cutting blade with a new one is extended, the cutting apparatus becomes economically available. In addition, since the interval for replacing the cutting blade with a new one is extended, the downtime of the cutting apparatus is shortened, the working efficiency is improved, and its maintenance becomes easy.

BRIEF DESCRIPTION OF THE DRAWINGS

FIG. 5 is an illustration of the relative locations of the blade block, sheathed optical fiber and cutting blade in the cutting apparatus shown in FIG. 1.

FIG. 6 is a diagram illustrating how the index plunger works in the cutting apparatus of FIG. 1.

FIG. 7 is a plan view illustrating the major constituting parts according to a second embodiment of the invention;

FIG. 16 is a schematic view illustrating another prior-art sheathed optical fiber cutting apparatus.

BEST MODE FOR CARRYING OUT THE INVENTION

[Embodiment-1]

The first embodiment of the sheathed optical fiber cutting apparatus according to the present invention is now described in detail, referring to FIGS. 1–6.

Figure 1:
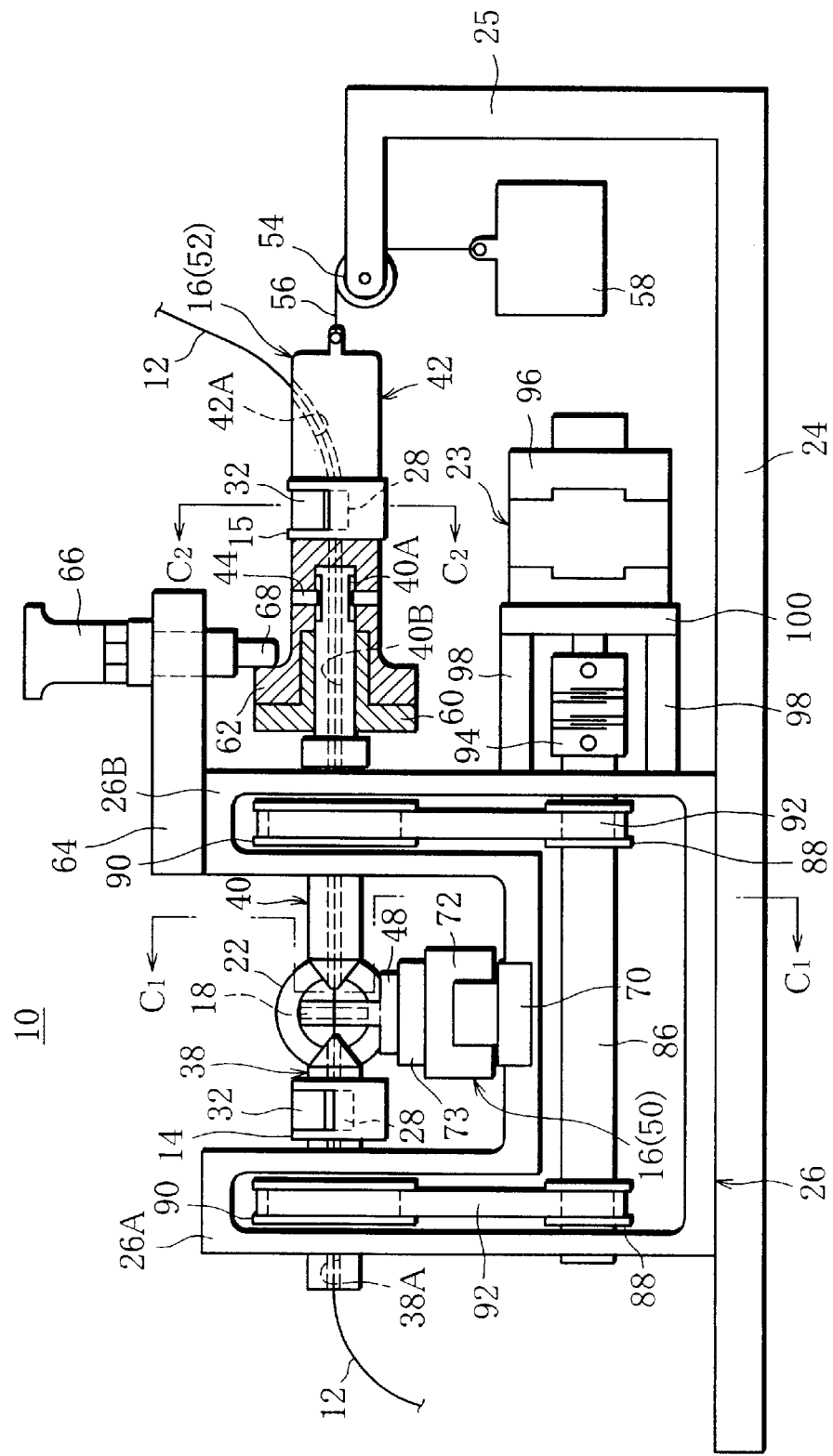
FIG. 1 is a front view of a first embodiment of a sheathed optical fiber cutting apparatus according to the present invention.
Figure 2:
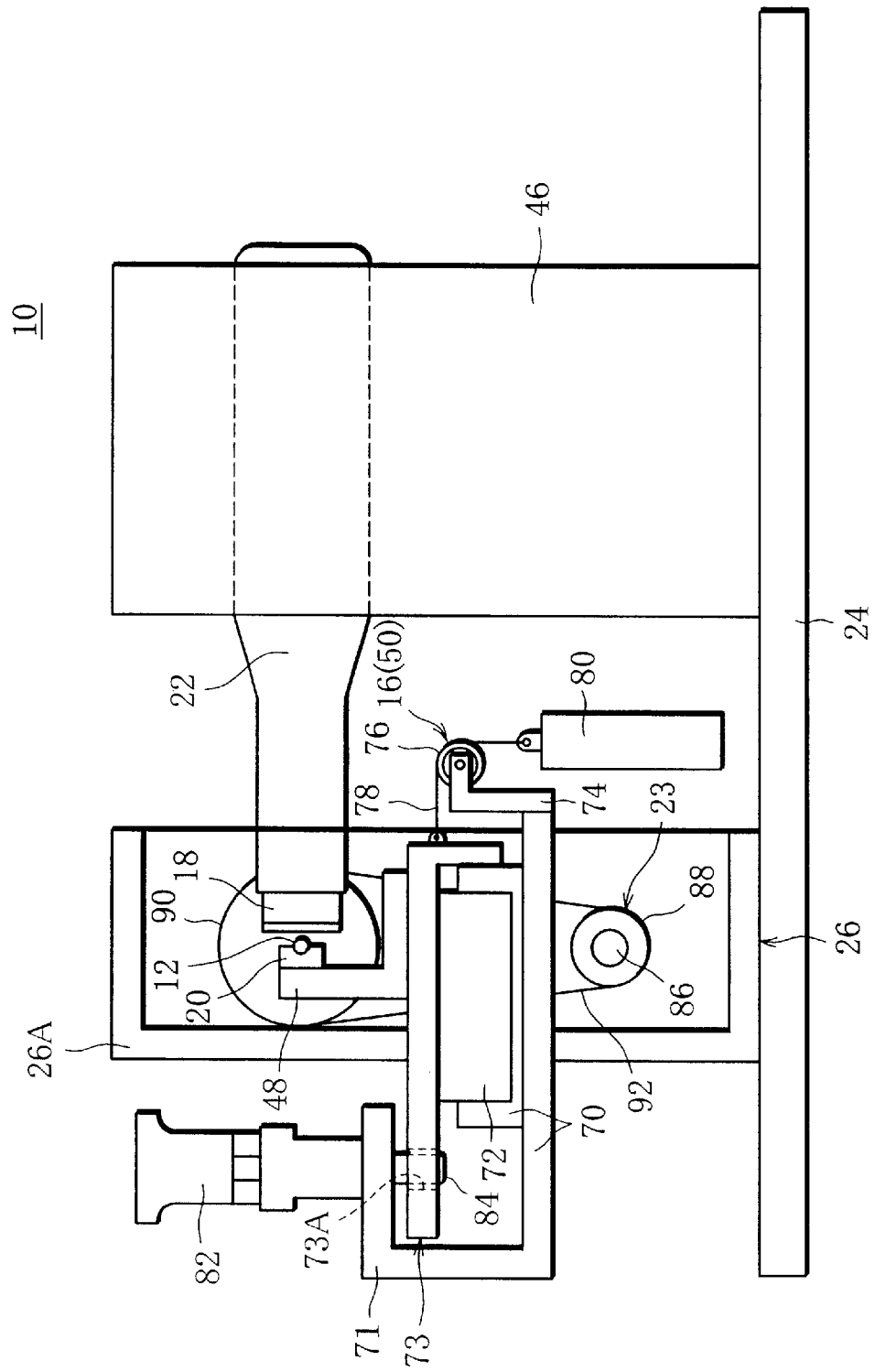
FIG. 2 is a right angle view taken along the C1—C1 line in FIG. 1.
Figure 3:
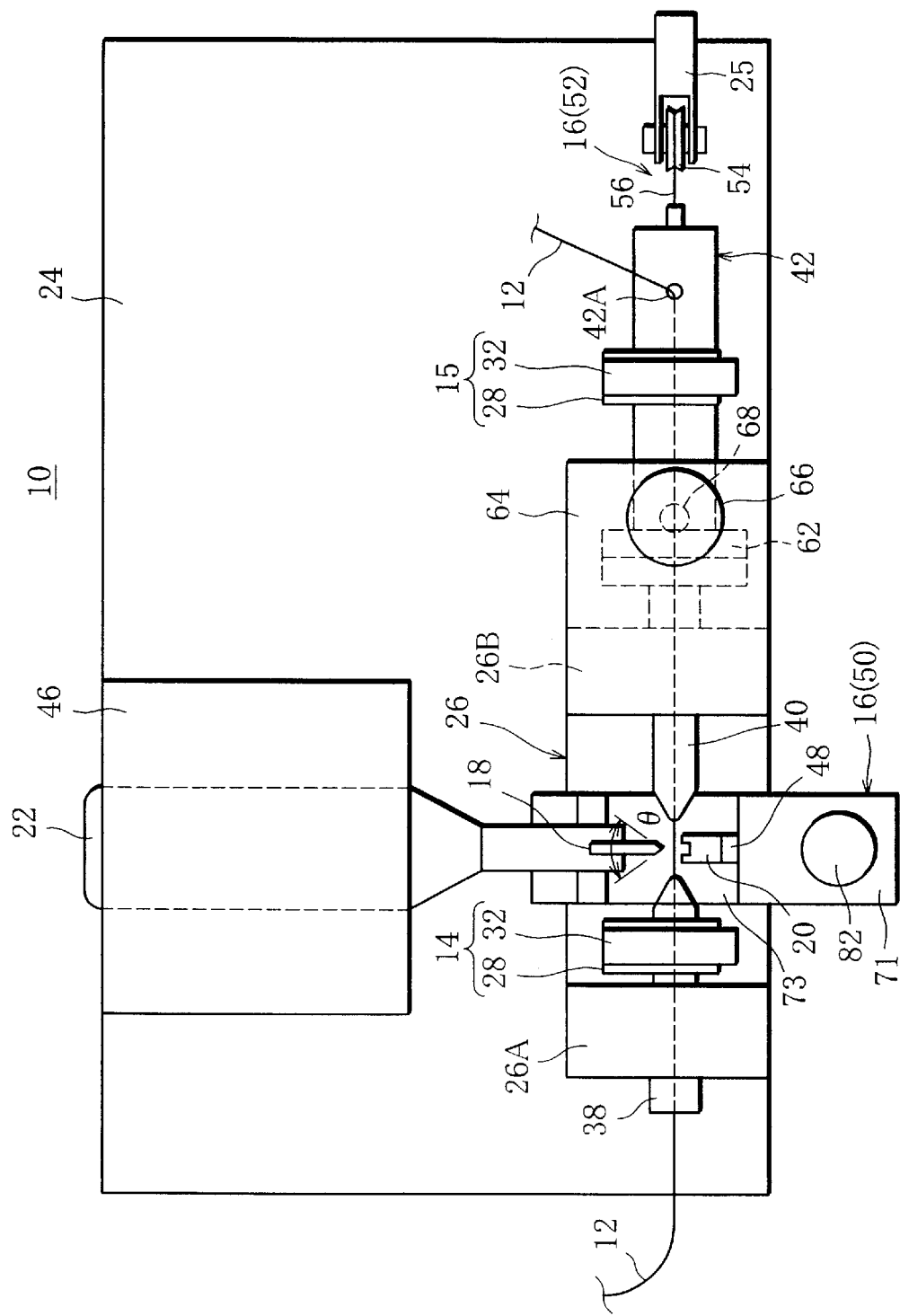
FIG. 3 is a plan view of the cutting apparatus shown in FIG. 1.
Figure 4:
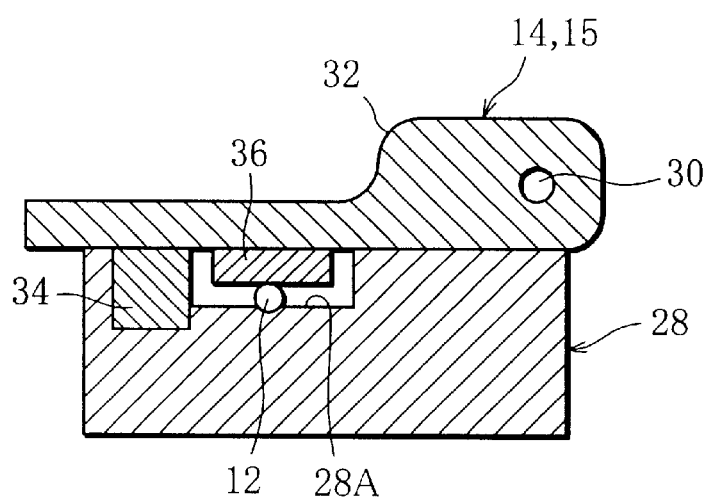
FIG. 4 is a sectional view taken along the C2—C2 line showing an example of the clamp part of the cutting apparatus shown in FIG. 1.

The sheathed optical fiber cutting apparatus 10, as shown in FIGS. 1–3, has clamp parts 14 and 15 that hold a sheathed optical fiber (hereafter, simply "sheathed fiber") 12, a cutting blade 18, an ultrasonic vibrator 22, a blade block 20, tension providing means 16 and rotating means 23.

The sheathed fiber 12 that will be cut has an optical fiber composed of a core and a clad and a sheath that is softer than the optical fiber and covers the optical fiber. In the sheathed fiber 12, its optical fiber is 125 $\mu$m in outer diameter, for example, and the outer diameter of the sheath, namely, the outer diameter of the sheathed fiber 12 is 400 $\mu$m. The optical fiber of the sheathed fiber 12 is made of brittle quartz-based glass, while its sheath is made of UV-set resin.

The clamp parts 14 and 15 are located in two positions along the longitudinal direction of the sheathed fiber 12, namely, on the sides of a column 26A and a column 26B in the housing 26 mounted on a base 24. The clamp parts 14 and 15 each have a holder 28, a clip member 32, a magnet 34 and a rubber member 36, as shown in detail in FIG. 4.

The holder 28 is mounted halfway between a hollow rotary shaft 38 and a tension transmission shaft 42 and has an opening groove 28A (see FIG. 4) that guides the sheathed fiber 12. The clip member 32 is hinge-coupled with the holder 28 by a pin 30 so that it may smoothly open and close. A part of the magnet 34 is embedded in the holder 28 and pulls the clip member 32 by its magnetic force. The rubber member 36 is mounted inside the clip member 32 to push the sheathed fiber 12 onto the opening groove 28A.

The depth of the opening groove 28A is set at 0.3 mm. It is preferable to set the depth of the opening groove at this magnitude because this setting makes the sheathed fiber 12 protrude as much as at least its ¼ above the opening groove 28A. Then the sheathed fiber 12 is firmly fixed.

In addition to the structure relying on magnet force, tightening structures using, for example, a toggle clamp and a pin vice (drill chuck) may be employed as the structure of the clamp parts 14 and 15.

The column 26A holds the hollow rotary shaft 38 that guides the sheathed fiber 12 so that the shaft may smoothly rotate. The hollow rotary shaft 38 has an insert hole 38A formed in its center along the longitudinal direction.

Meanwhile, the column 26B holds a hollow rotary shaft 40 that guides the sheathed fiber 12 in a position to a predetermined distance away from the hollow rotary shaft 38 along the same axis as that of the hollow rotary shaft 38 so that the hollow rotary shaft 40 may smoothly rotate.

The hollow rotary shaft 40 has an insert hole 40B (see FIG. 1) that passes through its center along the longitudinal direction. The hollow rotary shaft 40 is inserted into the center of the tension transmission shaft 42 concentrically along the common axis. The hollow rotary shaft 40 is laterally inserted in the tension transmission shaft 42, and coupled and fixed with the tension transmission shaft 42 by a pin 44 of which end is engaged with a engaging long-groove 40A for synchronous rotation.

In the tension transmission shaft 42, an outlet hole 42A is formed on the top of its end for taking out the sheathed fiber 12, as shown in FIG. 2 and FIG. 3. The other end of this outlet hole 42A is connected to the inlet hole 40B in the hollow rotary shaft 40.

Referring to FIG. 1 and FIG. 2, the cutting blade 18 and the blade block 20 are located between the hollow rotary shaft 38 and the hollow rotary shaft 40.

The cutting blade 18 is mounted on the extremity of the ultrasonic vibrator 22 that serves as the vibration generating means. The cutting blade 18 makes an incision in an area that has a bent curvature larger than that of the center of the bent optical fiber, toward the center of the sheathed fiber 12. This is an area on the tension-applied surface 12A (see FIG. 5E) of the sheathed fiber 12 to which a tension is applied by fiber bending.

Figure 5A:
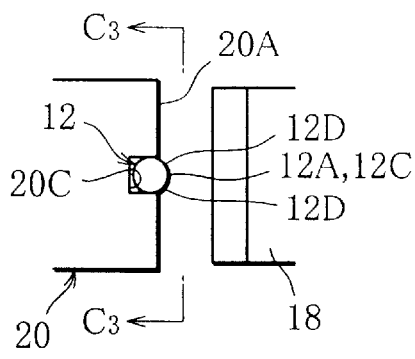
FIG. 5A is a schematic side view illustrating a sheathed optical fiber guided into the concave groove of the blade block.
Figure 5B:
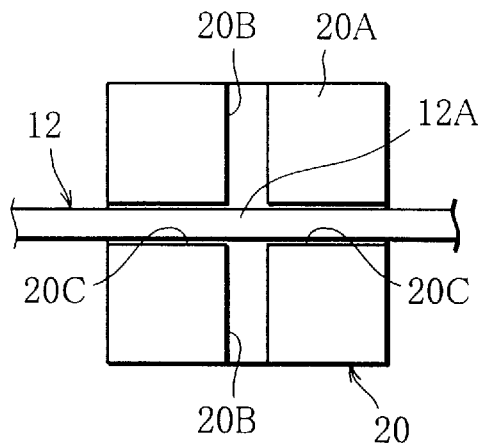
FIG. 5B is a right angle view along the C3—C3 line in FIG. 5A.
Figure 5C:
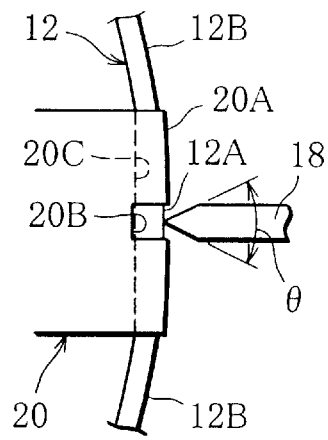
FIGS. 5C and 5D are two different examples illustrating the creation of an incision on the tension-applied surface of the sheathed optical fiber by pushing the blade block onto the cutting blade via the sheathed optical fiber.
Figure 5D:
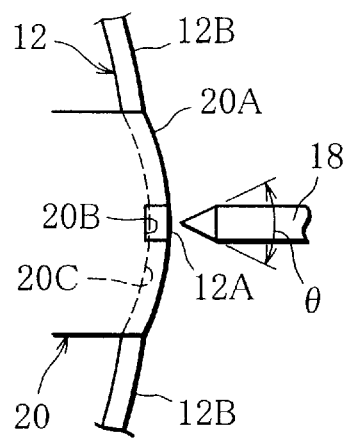

The cutting blade 18 is made of stainless steel and is a flat blade, for example, that is 0.1 mm in blade thickness, 10 mm in blade length and 13 degrees in edge angle θ (see FIG. 3, FIG. 5C and FIG. 5D). The blade may be triangle and round as well as flat. If the edge angle θ exceeds 60 degrees, the edge of the cutting blade 18 is likely to slip off the sheath of the sheathed fiber 12 when cutting the sheathed fiber 12, and then it becomes difficult to cut the sheath so that the sheared edge of the sheath is flat. On the other hand, if the edge angle is smaller than 5 degrees, the blade edge easily becomes chipped with poor durability. In addition, it becomes impossible to cut the sheath flat because of the chipping of the blade edge. Thus it is preferable that the cutting blade 18 has an edge angle between 5–60 degrees.

The ultrasonic vibrator 22 is vibration generating means for vibrating the cutting blade 18 in the radial direction of the sheathed fiber 12 and mounted on the base 24 via a block-like ultrasonic vibrator holder 46. This ultrasonic vibrator 22 is capable of vibrating at a frequency between 1–100 kHz, for example.

The ultrasonic vibrator 22 according to the present invention moves the cutting blade 18 mounted on its extremity back and forth at a frequency between 20–30 kHz in order to cut the sheathed fiber 12. Besides, the ultrasonic vibrator 22 is mounted in the holder 46 so that the relative position of the cutting blade 18 and the sheathed fiber 12 may not change and so that vibration alone may not let the cutting blade 18 contact the tension-applied surface 12A of the sheathed fiber 12, leaving a gap of around 0.8–1 mm from the tension-applied surface 12A.

This gap allows forming the tension-applied surface 12A (FIG. 5E) provided with a tension generated on the outer surface of the bent fiber when the blade block 20 is pushed onto the sheathed fiber 12. As a result, the tension gradually increases in the sheathed fiber 12 as the incision made by the cutting blade 18 develops in the tension-applied surface 12A. Since the incision made by the cutting blade 18 widens due to the bending of the sheathed fiber 12, it becomes possible to reduce the collapse of the sheath above the incision made by the cutting blade 18.

The vibration generating means for vibrating the cutting blade 18 may adopt vibration mechanisms such as the eccentric weight rotary type and electromagnetic coil/sliding index plunger type as well as the ultrasonic vibrator 22.

The blade block 20 is placed against the cutting blade 18, sandwiching the sheathed fiber 12, and holds the sheathed fiber 12 that will be made an incision by the cutting blade 18. The blade block 20 is mounted on an L-shape holder 48, as shown in FIG. 2, FIG. 3 and FIG. 5A. The blade block 20 is placed off the sheathed fiber 12 so that the working surface 20A, which will contact the sheathed fiber 12, does not contact the sheathed fiber 12 during the standby period of cutting no fibers. Referring FIG. 5B, the blade block 20 has crossing concave grooves 20B and 20C on its working surface 20A.

The concave groove 20B is the groove that receives the blade edge of the cutting blade 18, and its groove bottom is made flat. The concave groove 20C is the groove that guides the sheathed fiber 12. Its groove bottom may be either flat as shown in FIG. 5C or curved as shown in FIG. 5D in the same direction of the curvature of the bent sheathed fiber 12.

If the concave groove 20C is formed to present a curvature as shown in FIG. 5D, there will be the following merits. When the blade block 20 is moved toward the sheathed fiber 12 and the sheathed fiber 12 is inserted and guided, and pushed into the concave groove 20C, the bent sheathed fiber 12 well fits in the concave groove 20C. Then since the concave groove 20C helps the sheathed fiber 12 bend with no excessive strain, the fear of damaging the sheathed fiber 12 is eliminated. As a result, it becomes easy to form the tension-applied surface 12A to which a tension is applied by bending in the sheathed fiber 12.

Figure 5E:
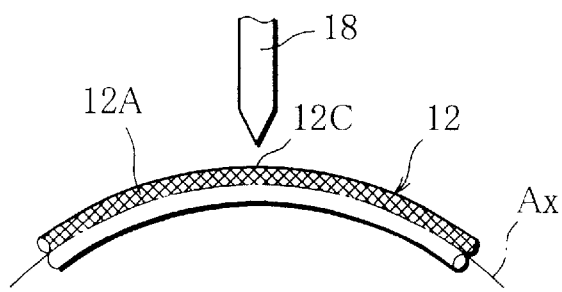
FIG. 5E is an illustrative diagram indicating the range of the tension-applied surface of an optical fiber on which an incision is made with the cutting blade.

In this case, the tension-applied surface 12A is formed on the outer side of the curvature of the fiber relative to center axis Ax of the sheathed fiber 12, as shown in FIG. 5E. In the blade block 20 shown in FIG. 5D, the curvature of its working surface 20A is formed to match the curvature formed by the bottom of the concave groove 20C, with the concave groove 20B being the boundary.

The tension-applied surface 12A of the sheathed fiber 12 is not limited to that formed on its outer surface in the convex curvature shown in FIG. 5E in the radial direction. For example, the tension-applied surface 12A may be an outer area of the fiber, which is provided with a tension, being held by the blade block 20 and away from the summit of the convex curvature toward the longitudinal direction along center axis Ax (right-hand or left-hand in FIG. 5E). Besides, the tension-applied surface 12A may be an outer surface 12B of the curvature in FIG. 5C and FIG. 5D, which is away from the blade block 20 in the longitudinal direction of the sheathed fiber 12. Yet further, as shown in FIG. 5A, the location of the tension-applied surface 12A is not limited to the summit 12C of the fiber shown in FIG. 5A, seen from the axial direction of the sheathed fiber 12, but may be an outer surface 12D that is away either right or left by a predetermined angle from the summit 12C in the circumferential direction.

In other words, the tension-applied surface 12A may be any part of the outer surface to which a tension is applied in the sheathed fiber 12, namely, the outer surface (cross-hatched section)(see FIG. 5E) of a bent curvature larger than that of the center of the bent sheathed fiber 12. However, in the tension-applied surface 12A, the summit of the sheathed fiber 12 in FIGS. 5C and 5D and the summit 12C in FIG. 5A are particularly preferable as the place where an incision is made by the cutting blade 18.

The tension providing means 16 forms the tension-applied surface 12A on the outer surface of the bent sheathed fiber 12 by applying a tension in the axial direction in addition to the tension on the fiber outer surface due to fiber bending. The tension providing means 16 has a push mechanism 50 and a tension providing mechanism 52.

The push mechanism 50 forms the tension-applied surface 12A (see FIG. 5E) where a tension is applied by bending the sheathed fiber 12 through pushing the blade block 20 onto the sheathed fiber 12, for example. Further, the pushing mechanism 50 has the function of making incisions in the tension-applied surface 12A by pushing the tension-applied surface 12A onto the cutting blade 18.

Referring to FIG. 2, the pushing mechanism 50 has a base 70, a slide table 72, a weight 80 (the weight is about 30 gf) and an index plunger 82 (hereafter, simply "plunger").

The base 70 is installed in the center of the housing 26. The slide table 72 is installed so that it can shuttle toward the sheathed fiber 12 on the base 70, and has a table base 73 on which a holder 48 is mounted. The weight 80 is suspended by a tension wire (including the string unit) 78. One end of the tension wire 78 is connected to the side of the ultrasonic vibrator 22 on the table base 73, while the weight 80 is suspended from the other end that is guided by a pulley 76 mounted on the base 70 via an arm 74. The plunger 82 is installed in the end of the base 70 opposite to the side of the weight 80, via an inverse-L shape arm 71, and has an operation rod 84 that is engaged with a engaging hole 73A formed in the table base 73.

Referring to FIG. 2, the plunger 82 is engaged with the engaging hole 73A by extruding the operation rod 84 in the case of cutting no optical fibers 12. Then since the movement of the slide table 72 toward the sheathed fiber 12 is limited, no tension is applied to the surface of the sheathed fiber 12.

Meanwhile, when cutting the sheathed fiber 12, the sheathed fiber 12 is held with the clamp parts 14 and 15. Then the operation rod 84 of the plunger 82 is moved upward and pulled out of the engaging hole 73A. As a result, the weight 80 pulls the slide table 72 toward the sheathed fiber 12 along with the blade block 20.

The blade block 20 is then pushed onto the sheathed fiber 12 which is guided by the concave groove 20C and the sheathed fiber 12 bends. The tension-applied surface 12A, which is provided with a tension at least due to the fiber bending, is formed on the fiber surface of which bent curvature (radius of curvature) becomes the largest in the sheathed fiber 12. At the same time the tension-applied surface 12A is pushed onto the cutting blade 18. Thereby an incision is made in the tension-applied surface 12A of the sheathed fiber 12.

The tension providing mechanism 52 works to provide an additional tension to the tension-applied surface 12A by pulling the sheathed fiber 12 in its axial direction. The tension providing mechanism 52, as shown in FIG. 1 and FIG. 3, has a tension transmission shaft 42, a weight 58 (the weight is about 200 gf), a linear bush 60, a flange 62 and an index plunger (hereafter, simply "plunger") 66.

Referring to FIG. 2 and FIG. 3, the tension transmission shaft 42 has an outlet hole 42A for taking out the sheathed fiber 12 on the top of its end. The outlet hole 42A is connected to the inlet hole 40B in the hollow rotary shaft 40. The weight 58 is suspended from a tension wire (including the string unit) 56. One end of the tension wire 56 is connected to the back end of the tension transmission shaft 42, while the weight 58 is suspended from the other end that is guided by a pulley 54 mounted on the column 25 of the base 24.

The linear bush 60 exists between the hollow rotary shaft 40 and the tension transmission shaft 42. A flange 62 is formed on the front end of the tension transmission shaft 42 and engages an operation rod 68 of the plunger 66, as described later, so that the movement of the tension transmission shaft 42 is limited. The plunger 66 is mounted on the top of the column 26B via an arm 64 and has the operation rod 68 that is engaged with the flange 62.

Figure 6A:
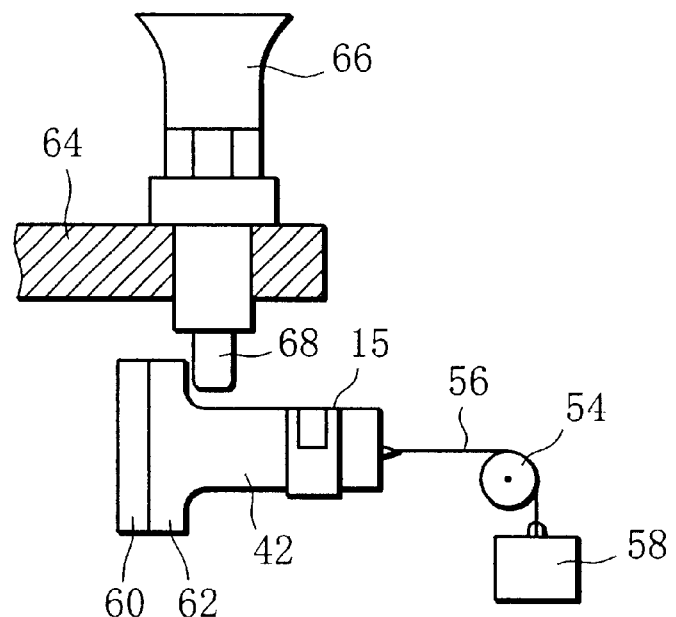
FIG. 6A is a diagram illustrating the state in which no tension is applied to the sheathed optical fiber.

The plunger 66 extrudes the operation rod 68 downward, as shown in FIG. 6A, when cutting no sheathed fibers 12, 50 that it is engaged with the flange 62. Since the tension transmission shaft 42 is restricted in its movement toward right-hand in the figure, no tension is applied to the sheathed fiber 12.

Figure 6B:
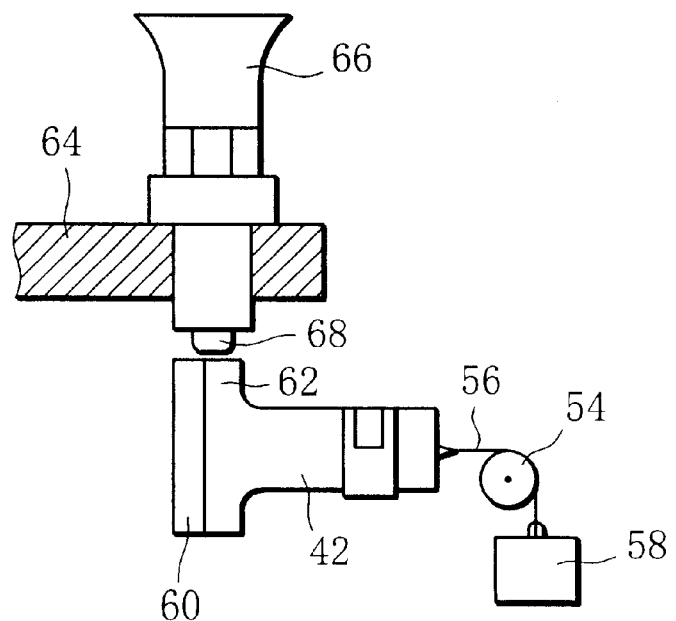
FIG. 6B is a diagram illustrating the state in which a tension is applied to the sheathed optical fiber.
Figure 8:
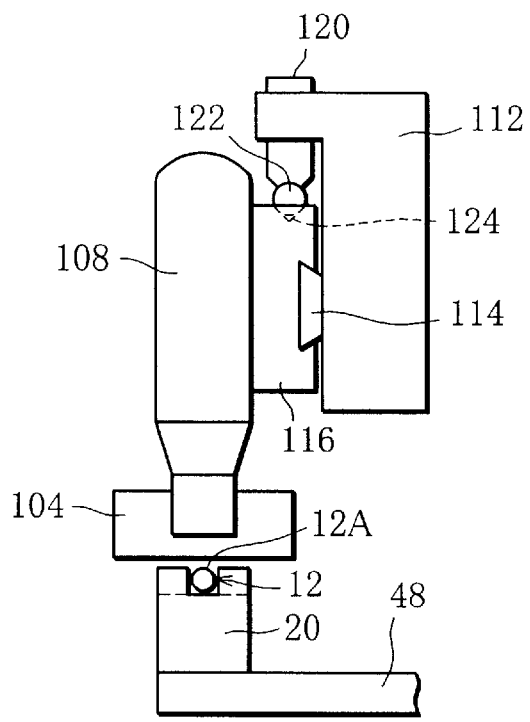
FIG. 8 is a side view seen from the direction indicated with arrow A in FIG. 7.
Figure 9:
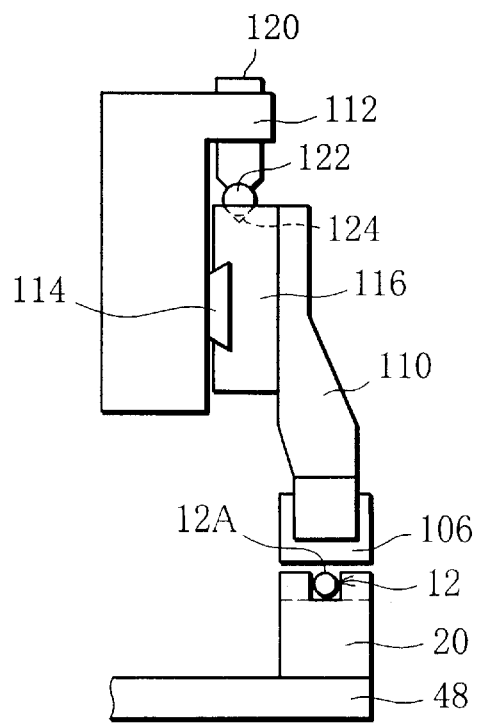
FIG. 9 is a side view seen from the direction indicated with arrow B in FIG. 7.

Meanwhile, when cutting the sheathed fiber 12, the sheathed fiber 12 is held by the clamp parts 14 and 15. Next, the plunger 66 moves the operation rod 68 back upward, as shown in FIG. 6B, to release the engagement of the flange 62. Then the tension transmission shaft 42 is pulled away (right-hand in FIGS. 1 and 3) from the clamp part 14 by the weight 58.

The sheathed fiber 12 is pulled by the weight 58 and a fixed tension is thereby constantly applied to the sheathed fiber 12 in the axial direction. Thus an additional tension is applied to the inside of the sheathed fiber 12 including the tension-applied surface 12A. The tension in the axial direction can be controlled by changing the mass of the weight 58.

The tension providing means 16 has the pushing mechanism 50 and the tension providing mechanism 52, as described before. As a result, when the cutting blade 18 makes an incision in the tension-applied surface 12A of the sheathed fiber 12 toward its center, the applied tension gradually increases as the incision made by cutting blade 18 becomes deeper. Then in the sheathed fiber 12, the incision made by the cutting blade 18 easily develops and the contact friction between the cutting blade 18 and the incision becomes smaller. As a result, it becomes easy for the cutting blade 18 to cut the sheath of the sheathed fiber 12 and the optical fiber so that their sheared edges are flat.

The rotating means 23 relatively rotates the sheathed fiber 12 around its center axis Ax (see FIG. 5E) against the cutting blade 18. Referring to FIGS. 1–3, the rotating means 23 has a transmission shaft 86, two driving pulleys 88, two driven pulleys 90, two timing belts 92 and a driving motor 96.

The transmission shaft 86 is positioned in the lower portions of the columns 26A and 26B through both columns. The two driving pulleys 88 are mounted on the transmission shaft 86 each on the side of column 26A and on the side of column 26B. The two driven pulleys 90 are each mounted on the hollow rotary shafts 38 and 40. Each timing belt 92 is looped between the driving pulley 88 and the driven pulley 90 and transmits the rotation of the transmission shaft 86 to the hollow rotary shafts 38 and 40 in synchronization with each other in order to rotate the hollow rotary shaft 38 and 40 in the same direction at the same speed. The driving motor 96 is coupled with the transmission shaft 86 via a coupling 94 and transmits the rotary force to the hollow rotary shafts 38 and 40. The driving motor 96 is supported by a bracket 100 mounted on the column 26B via a pillar 98. Further, a tightener, not shown, is installed in the timing belts 92 for applying a tension to the belts 92.

The driving force transmission mechanism that transmits the force of the transmission shaft 86 to the hollow rotary shafts 38 and 40 may be those employing chains, gears and the likes as well as the above belt like the timing belt 92. In the rotating means 23, the rotation decelerating ratio between the output shaft (transmission shaft 86) of the driving motor 96 and the hollow rotary shafts 38 and 40 is set at 2:1, for example. Then the sheathed fiber 12 held by the clamp parts 14 and 15 on the side of the hollow rotary shafts 38 and 40 is rotated around rotation axis Ax at a rotation speed between 6 and 30 rpm to make an incision in its sheath in the circumferential direction, and then another incision is made in the optical fiber as well.

Next, the method of cutting the sheathed fiber 12 using the cutting apparatus according to the first embodiment of the present invention will be explained below.

First, the sheathed fiber 12, which is to be cut and is still sheathed, is inserted in the tension transmission shaft 42 from the sheathed optical fiber inlet hole 38A of the hollow rotary shaft 38 via the hollow rotary shafts 38 and 40, and then the end of the sheathed fiber 12 is taken out from the outlet hole 42A of the tension transmission shaft 42. The clip members 32 of the clamp parts 14 and 15 are opened so that the sheathed fiber 12 runs through the opening groove 28A.

Next, the sheathed fiber 12 is held by the clamp parts 14 and 15 by closing the clip members 32 through the magnetic force of the magnets 34.

Next, the driving motor 96 of the rotating means 23 is activated and transmits its force (torque) to the hollow rotary shafts 38 and 40 from the transmission shaft 86, via the driving pulleys 88, timing belts 92 and driven pulleys 90. As a result, the sheathed fiber 12 rotates clockwise or counter-clockwise in FIG. 2 around center axis Ax at a rotation speed, 20 rpm, for example.

At almost the same time as the start of the driving motor 96, namely, the start of rotation of the sheathed fiber 12, or immediately after this rotation start, the operation rod 84 of the plunger 82 is pulled back to leave the engaging hole 73A. Then the slide table 72 and the blade block 20 are moved toward the sheathed fiber 12, and the blade block 20 is pushed on the sheathed fiber 12, with the sheathed fiber 12 being guided in the concave groove 20C. As a result, the sheathed fiber 12 bends in its portion that is pushed by the blade block 20, and the tension-applied surface 12A of which outer surface is provided with a tension by the fiber bending (see FIGS. 5C and 5D) is formed.

When the slide table 72 and the blade block 20 further move, the tension-applied surface 12A of the sheathed fiber 12 is pushed on the cutting blade 18, and the cutting blade 18 makes an incision in the sheathed fiber 12 from the tension-applied surface 12A toward the fiber center. Then the sheathed fiber 12 bends in its portion that is pushed by the blade block 20, as described before, to form the tension-applied surface 12A, and the sheathed fiber 12 is rotating. Therefore, the incision gradually develops in depth in the circumferential direction of the sheathed fiber 12 all around the fiber and then the sheath is sheared.

When the blade block 20 further proceeds and the edge of the cutting blade 18 has reached the outer surface of the optical fiber, an incision is made in its outer surface. Then since the optical fiber of the sheathed fiber 12 is made of a brittle material, quartz glass, the optical fiber quickly cuts. As a result of such shear of the sheath and cut of the optical fiber, the sheathed fiber 12 is cut in a single process so that no step is formed between the sheath and the optical fiber, and the cutting edge is flat and perpendicular to the axial direction.

When the cutting blade 18 makes an incision in the tension-applied surface 12A toward the center of the sheathed fiber 12, as shown in FIG. 5E, the incision is made in the area (cross-hatched section) having a bent curvature larger than that of the center of the bent fiber from the tension-applied surface 12A toward the center of the optical fiber. The cutting blade 18 makes an incision in the area having such a large bent curvature in the sheathed fiber 12.

Therefore, as described later, the contact friction between the incision in the sheathed fiber 12 and the cutting blade 18 becomes small, and the fear that the blade edge may crush the incision in the sheathed fiber 12 is eliminated. Then it becomes possible to make the sheared edge of the sheathed fiber 12 flat.

When the cutting blade 18 has sheared the sheath and reached the outer surface of the optical fiber, an incision is made in the surface of the optical fiber. Since a tension is applied to the surface of the sheathed fiber 12, the optical fiber is quickly sheared before the cutting blade 18 has reached the optical fiber center. Further, since the cutting blade 18 relatively rotates around center axis Ax of the sheathed fiber 12, incisions are made in the sheathed fiber 12 not from a single direction but all directions around the fiber.

In order to shear the sheath and cut the optical fiber to cut apart the sheathed fiber 12, it is preferable to rotate the sheathed fiber 12 almost one turn (360 degrees), hopefully full one turn (360 degrees) or more around its center axis Ax. Nevertheless, since an excessive turn may cause problems such as damage in the sheathed fiber 12 due to torsion, it is preferable to limit the fiber rotation within three turns.

As described so far, in the optical fiber cutting method according to the present invention, the cutting blade 18 makes an incision in the area having a bent curvature larger than that of the center of the bent fiber, from the tension-applied surface 12A to which a tension is applied by the bending of the sheathed fiber 12 toward the fiber center to cut the sheathed fiber 12. Since the incision in the sheathed fiber 12 opens up toward the outside, the contact friction between the incision and the cutting blade 18 and the compression on this incision become small.

Then the sheath of the sheathed fiber 12 is hardly crushed or torn to present a rough surface in its incision, and the sheared edge of the sheath becomes flat. Since the cutting blade 18 makes an incision (notch) on the surface of the optical fiber, the sheared edge of the optical fiber becomes mirror-smooth. In addition to that the sheared edge of the sheath and the optical fiber becomes flat, their sheared edges are perpendicular to the axial direction and no step is left between the sheath and the optical fiber.

If the sheared edge of the sheathed fiber 12 becomes so flat as described above, it is possible to easily and quickly conduct after-treatment like edge polishing, and in some cases it is allowed to skip such after-treatment. It also becomes possible to efficiently and accurately measure the decentering of the sheath and mode fields such as the refractive index distribution in a single step.

The optical fiber of the sheathed fiber 12 may be made of not quartz-based glass but plastic material. Even if the optical fiber of the sheathed fiber 12 is made of a plastic material, an incision is made in its outer surface and the sheared edge of the optical fiber becomes mirror-smooth, as far as the optical fiber is made of a hard material.

According to the aforementioned cutting method, the sheathed fiber 12 is bent and rotated around center axis Ax. Under this condition, an incision is made in the tension-applied surface 12A to which a tension is applied due to fiber bending, and then the sheathed fiber 12 is cut. In other words, the sheathed fiber 12 is cut without being pulled in its axial direction by the tension providing mechanism 52.

However, the sheathed fiber 12 is rotated by the rotating means 23 after it has been held by the clamp parts 14 and 15. In addition to bending of the sheathed fiber 12 using the pushing mechanism 50, the tension providing mechanism 52 of the tension providing means 16 moves the operation rod 68 of the plunger 66 back to release the engagement of the flange 62. In this way a tension in the axial direction, in addition to rotation and bend, is applied to the sheathed fiber 12 by pulling the sheathed fiber 12 with the tension transmission shaft 42 and others to provide a predetermined tension. The sheathed fiber 12 in this condition may be cut by making an incision with the cutting blade 18 in an area having a bent curvature larger than that of the bent fiber center, from the tension-applied surface 12A toward the fiber center.

Employing this cutting method, it becomes possible to apply a predetermined tension to the tension-applied surface 12A of the sheathed fiber 12, bending the sheathed fiber 12 with a gentle curvature of a large radius. Then no excessive torsion is applied to the sheathed fiber 12 and it is possible to prevent damage on the sheathed fiber 12 when bending the sheathed fiber 12 while relatively rotating it against the cutting blade 18 around center axis Ax. It also becomes easy to relatively rotate and bend the sheathed fiber 12 and the structure of the cutting apparatus becomes simple.

When cutting the sheathed fiber 12 using the tension providing mechanism 52 that pulls the sheathed fiber 12 in its axial direction, the tension applied to the sheathed fiber 12 gradually increases as the incision made by the cutting blade 18 develops in depth. Then the incision made by the cutting blade 18 easily opens up and contact friction between the cutting blade 18 and the incision becomes much smaller. As a result, it becomes possible to make the sheared edges of the sheath and the optical fiber created by the cutting blade flat with no difficulty.

When making an incision in the tension-applied surface 12A of sheathed fiber 12 by such a fiber cutting method, the operation rod 84 of the plunger 82 is moved back to leave the engaging hole 73A at latest before the blade block 20 is moved toward the sheathed fiber 12 to push the sheathed fiber 12 onto the cutting blade 18. Next, when the blade block 20 moves toward the sheathed fiber 12 and the cutting blade 18, the ultrasonic vibrator 22 is powered on and the cutting blade 18 may be vibrated toward the radial direction of the sheathed fiber 12 at a frequency, for example, 20 kHz. If an incision is made on the tension-applied surface 12A by the vibrating cutting blade 18, the friction between the cutting blade 18 and the optical fiber becomes smaller and a flat sheared edge is provided with higher probability.

The pushing mechanism 50 employed in the cutting apparatus according to the first embodiment provides a tension to the tension-applied surface 12A of the sheathed fiber 12 by pushing the blade block 20 onto the sheathed fiber 12 to bend the sheathed fiber 12. The pushing mechanism 50 moves the blade block 20 toward the cutting blade 18 and makes an incision by pushing the tension-applied surface 12A of the sheathed fiber 12 onto the cutting blade 18.

According to this configuration, it is possible to provide a tension to the tension-applied surface 12A and make an incision using the cutting blade 18 both continuously and smoothly. In addition to such effects, there is an advantage that the structure of the cutting apparatus becomes simple.

In another configuration of the pushing mechanism 50, it stops the movement of the blade block 20 after providing a tension to the tension-applied surface 12A and then makes an incision in the fiber by pushing the cutting blade 18, using an actuator (not shown) such as a fluid pressure cylinder and a screw mechanism, onto the tension-applied surface 12A, for example.

The fiber cutting apparatuses according to the following second to fifth embodiments of the invention have substantially the same configuration as that of the cutting apparatus according to the first embodiment. Thus the major differences will be focused on in the following explanation based on the accompanying drawings and the explanation of the other parts will not be repeated.

[Embodiment-2]

The cutting apparatus of the second embodiment has cutting blades 102 consisting of a cutting blade 104 for cutting the sheath and the other cutting blade 106 for cutting the optical fiber both mounted on a holder 112, instead of the cutting blade 18 for cutting the sheathed fiber 12.

The cutting blade 104 is mounted on the ultrasonic vibrator 108 that is the vibration generating means, while the cutting blade 106 is mounted on the attachment plate 110.

In the holder 112, a plunger 120 is mounted for precisely positioning the cutting blade 104 or 106 at the cutting position for the sheathed fiber 12, and a linear guide 114 is installed as well to exchange and guide the cutting blades 104 and 106.

Slide blocks 116 and 118 are installed in the linear guide 114 so that they may move in the longitudinal direction. The slide blocks 116 and 118 each have a lock groove 124 that receives an adjustable ball 122 of the plunger 120. The slide block 116 has the ultrasonic vibrator 108 equipped with the cutting blade 104, while the slide block 118 has an attachment plate 110 equipped with the cutting blade 106.

According to this configuration, the cutting blades 104 and 106 can shuttle between their positions for operation and standby corresponding to their cutting operation of the sheath and the optical fiber of the sheathed fiber 12.

The cutting blade 104 employs, for example, a stainless steel flat blade. The angle of the cutting edge is made small, for example, 13 degrees, to be thin enough to sharply cut the fiber without crush the sheath when cutting the sheathed fiber 12.

On the other hand, since the cutting blade 106 is to cut quartz-based glass, a sharp cutting edge becomes chipped and shows poor durability. Thus a flat blade is employed of which edge is made of diamond or a super-hard alloy.

When the cutting blade 106 makes another incision in the optical fiber along the incision that has been made in the sheath by the cutting blade 104, the cutting edge hardly slips off and the cutting operation becomes easy. Thus the angle θ (see FIG. 7) of the cutting edge of the cutting blade 106 may be larger than that of the cutting blade 104. For example, angle θ of the cutting edge of the cutting blade 106 may be 60 degrees or slightly smaller than 60 degrees. The cutting blade 106 may be installed in the attachment plate 110 via the ultrasonic vibrator(not shown) so that it ultrasonic-vibrates like the cutting blade 104.

When the sheathed fiber 12 is cut with this cutting apparatus, the slide block 116 is manually moved along the linear guide 114 and the cutting blade 104 is moved to the position for cutting the sheathed fiber 12, and then the ball 122 of the plunger 120 is set in the lock groove 124 for positioning. Meanwhile, the cutting blade 106 is held at the standby position in the left-hand in FIG. 7.

Next, as is the case with the cutting method according to the first embodiment, the sheathed fiber 12 is further pushed onto the cutting blade 104 after the blade block 20 is pushed onto the sheathed fiber 12. Then the cutting blade 104 shears the sheath on the tension-applied surface 12A of the sheathed fiber 12 and makes an incision.

Subsequently, the blade block 20 is moved back after it has made an incision in the sheath of the sheathed fiber 12 to release the pressure between the sheathed fiber 12 and the cutting blade 104, and then the slide block 116 is manually moved rightward in FIG. 7 to return the cutting blade 104 to the standby position in the right-hand.

Afterward, the slide block 118 set at the standby position in the left-hand is manually moved to the position for cutting the sheathed fiber 12 along the linear guide 114 and its position is fixed by the plunger 120. When the blade block 20 is push forward again to push the cutting edge of the cutting blade 106 onto the surface of the optical fiber of the sheathed fiber 12, an incision is made in the optical fiber and the optical fiber cuts. The cutting of the sheathed fiber 12 is thereby completed.

[Embodiment 3]

Figure 10:
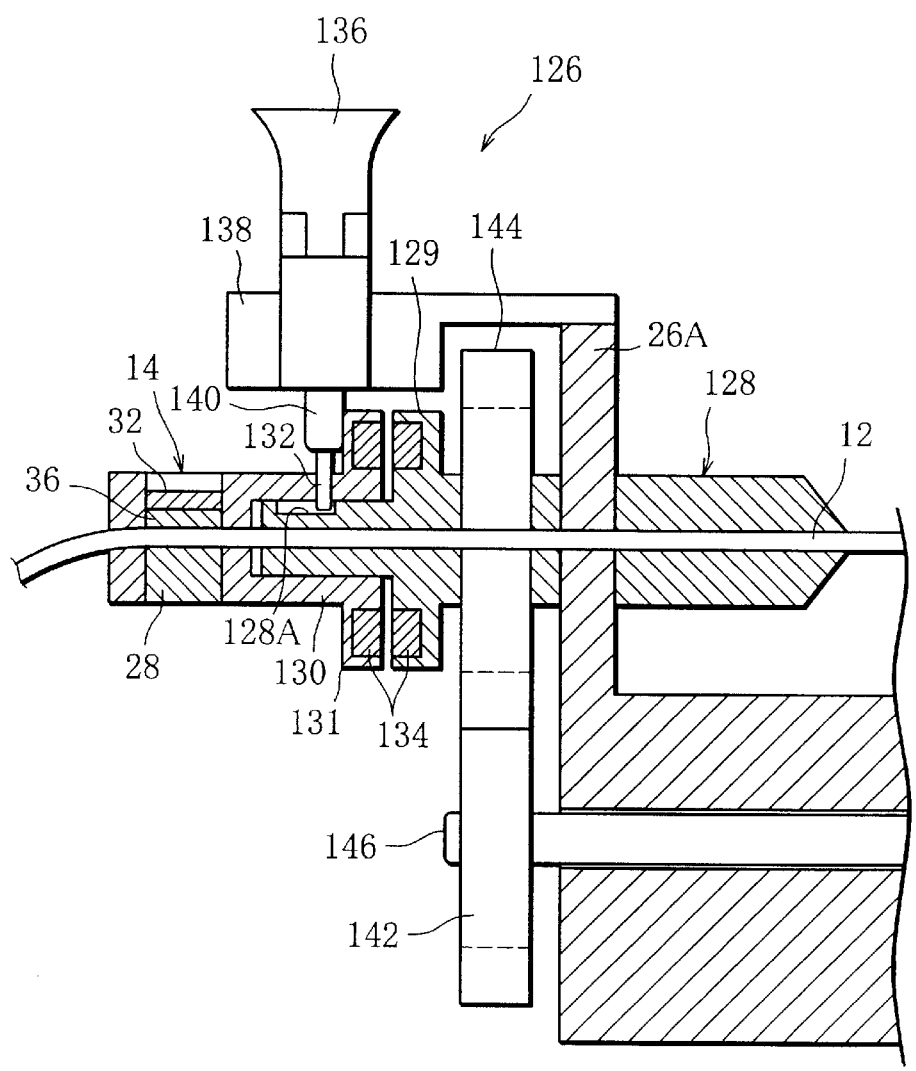
FIG. 10 is a front view illustrating the major constituting parts of the cutting apparatus according to a third embodiment of the invention.

The cutting apparatus according to the third embodiment uses a magnet-type tension providing mechanism 126, as shown in FIG. 10, instead of the mechanism employed in the first embodiment.

The tension providing mechanism 126 is installed, for example, on the side of the column 26A, and has a tension transmission shaft 130, flanges 129, 131, magnets 134 and an index plunger (hereafter, simply called "plunger") 136.

In the column 26A, a hollow rotary shaft 128 that guides the sheathed fiber 12 in its through hole is pivoted so that it may rotate with no restriction. The hollow rotary shaft 128 has a round flange 129 in a place close to its end (left-hand in FIG. 10). The rear end of the hollow rotary shaft 128 is fit in a tension transmission shaft 130 along the same axis.

The tension transmission shaft 130 has a hollow structure that can guide the sheathed fiber 12 in its through hole and has a round flange 131 in its front end (right-hand in FIG. 10) facing the flange 129. The tension transmission shaft 130 is connected and fixed to the hollow rotary shaft 128 with a pin 132 for synchronous rotation. The pin 132 is inserted from the side of the tension transmission shaft 130 and the end of the pin 132 is engaged with a long groove 128A for engagement in the hollow rotary shaft 128.

The tension transmission shaft 130, in a halfway position close to its rear end, has a holder 28 that holds the sheathed fiber 12. The holder 28 is mounted in the clamp part 14 that has been described in the first embodiment. On the confronting faces of the flanges 129 and 131, magnets 134 are embedded to exert a repulsive force between them. As a result, the tension transmission shaft 130 is moved by this repulsion between the magnets 134 to the direction (left-hand in FIG. 10) away from the hollow rotary shaft 128 to pull the sheathed fiber 12 in the axial direction and provide a tension thereto.

On the top of the column 26A, an index plunger 136 is mounted via an arm 138. The plunger 136 protrudes the operation rod 140 to engage it with the flange 131 and restricts the movement of the tension transmission shaft 130.

The tension providing mechanism 126 protrudes the operation rod 140 of the plunger 136 to engage it at the flange 131 except when the sheathed fiber 12 is cut. Then since the movement of the tension transmission shaft 130 is restricted, no tension is applied to the sheathed fiber 12.

Meanwhile, when cutting the sheathed fiber 12, the sheathed fiber 12 is held by the clamp part 14 and others. Later, the operation rod 140 of the plunger 136 is moved upward to release the engagement of the flange 131. Then the tension transmission shaft 130 moves away (left-hand in FIG. 10) from the hollow rotary shaft 128 driven by the repulsive force of the magnets 134 and a predetermined tension is applied to the sheathed fiber 12.

The sheathed fiber 12 is rotated around its center axis Ax by the combination of a driving gear 142 and a driven gear 144. Namely, the driven gear 144 is rotated by the driving gear 142 that turns driven by the rotation force transmitted by the transmission shaft 146 to rotate the sheathed fiber 12 around the center axis Ax.

[Embodiment 4]

Figure 11:
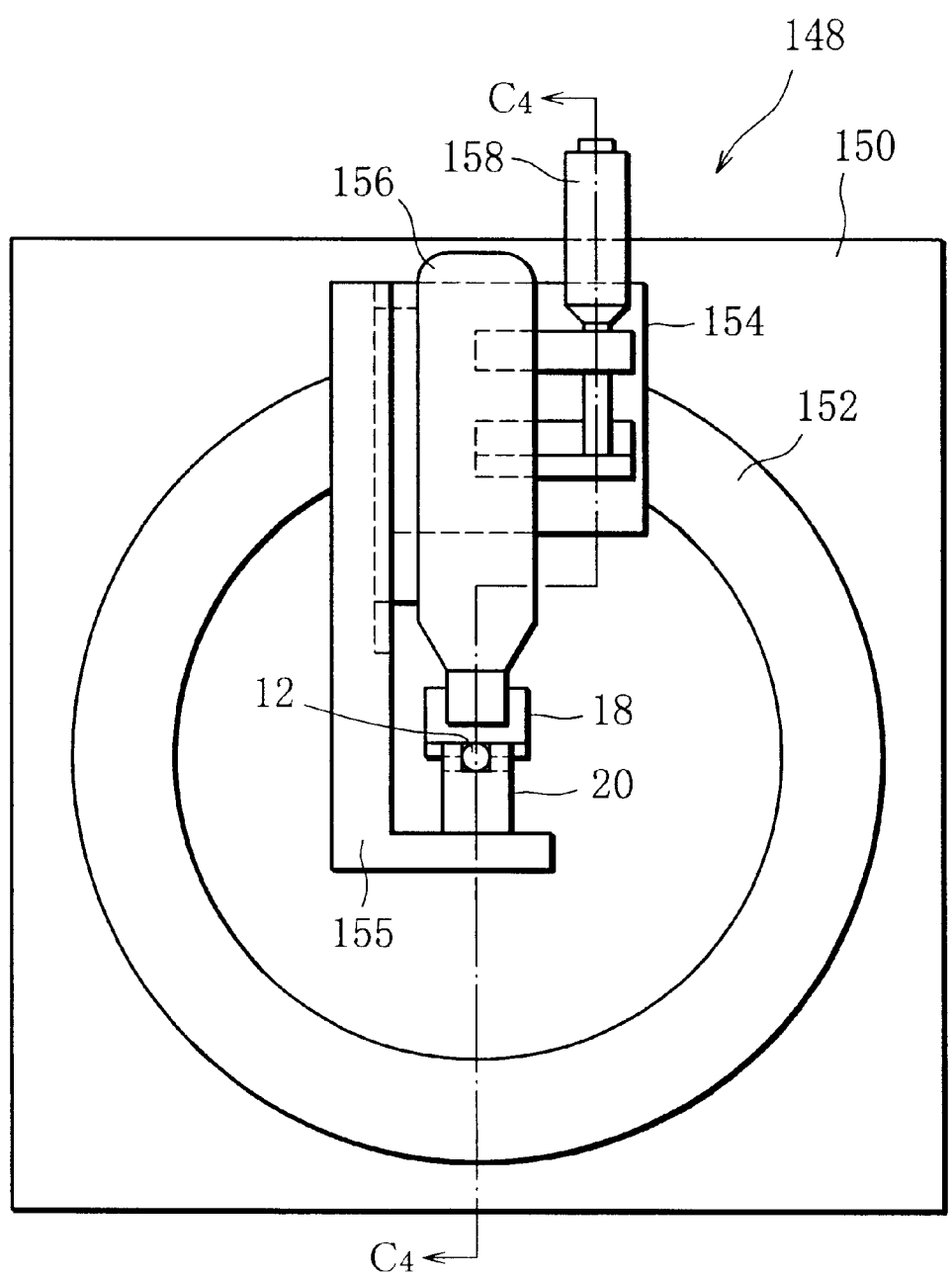
FIG. 11 is a side view illustrating the major constituting parts of the cutting apparatus according to a fourth embodiment of the invention.
Figure 12:
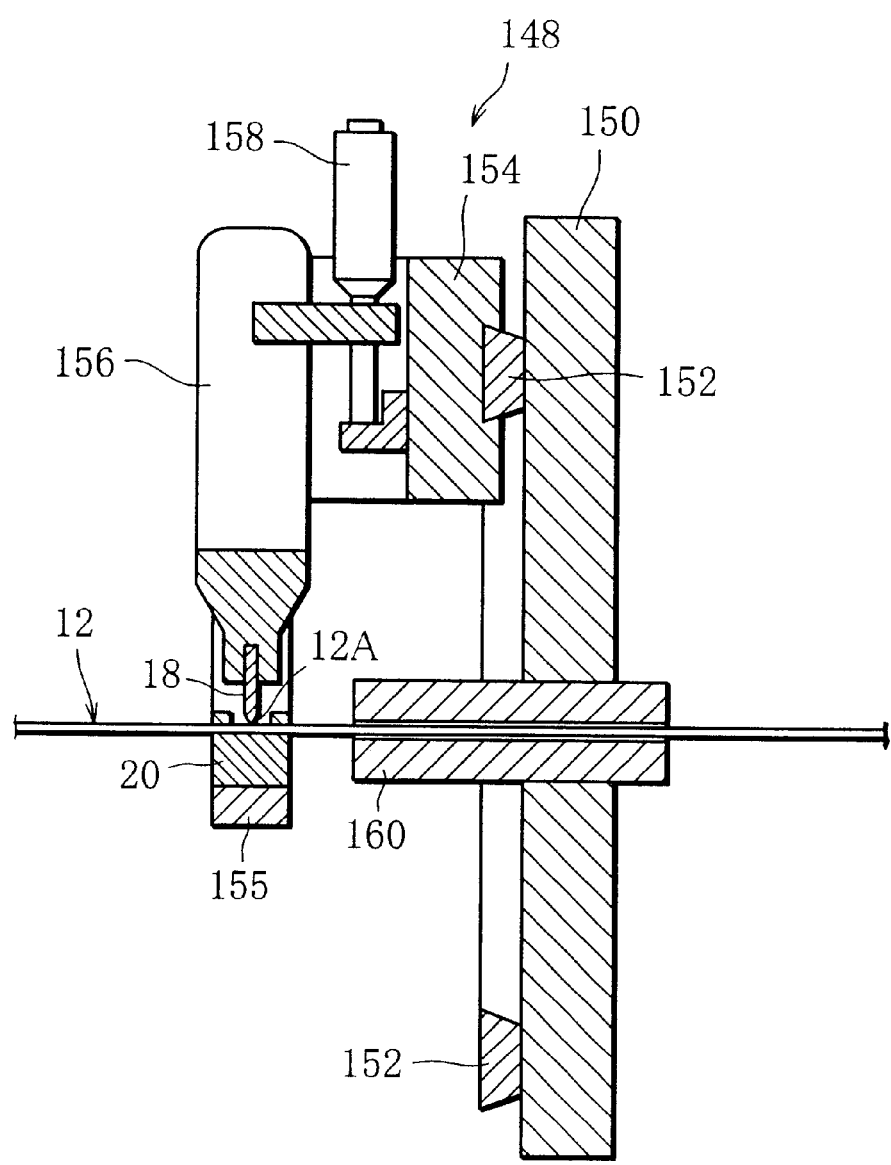
FIG. 12 is a sectional view along the C4—C4 line in FIG. 11.

The cutting apparatus according to the fourth embodiment has a configuration in which, as shown in FIG. 11 and FIG. 12, the sheathed fiber 12 is fixed not to rotate and the cutting blade 18 and the blade block 20 are rotated around center axis Ax of the sheathed fiber 12 by the rotating means 148 to cut the sheathed fiber 12.

The rotating means 148 that turns the cutting blade 18 and the blade block 20 is located between the clamp parts 14 and 15 of the first embodiment.

The rotating means 148 has a annular rail 152, a guide block 154, a supporting arm 155, an ultrasonic vibrator 156, a transport jig 158 and a dice 1160.

The annular rail 152 is mounted on a side of the fixed frame 150 concentrically with the sheathed fiber 12 lying through the fixed frame 150.

The guide block 154 supports the ultrasonic vibrator 156 and the transport jig 158 and is mounted on the annular rail 152 by a driving means (not shown) so that it may move in the circumferential direction of the annular rail.

The supporting arm 155 is mounted on the guide block 154, facing the cutting blade 18 with a predetermined distance away from the rotation center (center of the annular rail 152) of the cutting blade 18 toward the outer radial direction.

The ultrasonic vibrator 156 is vibration generating means that has a cutting blade 18 on its end and mounted in the guide block 154 so that it may move to and away from the sheathed fiber 12.

The transport jig 158 is mounted between the guide block 154 and the ultrasonic vibrator 156. The transport jig 158 is, for example, a screw-type transport jig that moves the ultrasonic vibrator 156 to push the cutting blade 18 onto the tension-applied surface 12A of the sheathed fiber 12.

The dice 160 is mounted on the fixed frame 150 where the sheathed fiber 12 passes through and guides the sheathed fiber 12 in its throughhole.

In the cutting apparatus according to the fourth embodiment, the blade block 20 located away from the rotation center of the cutting blade 18 pushes the cutting blade 18, which is vibrated by the ultrasonic vibrator 156, onto the tension-applied surface 12A. Then a tension may be applied to the tension-applied surface 12A by pulling the sheathed fiber 12, as necessary, in its axial direction.

At the same time, the rotating means 148 is activated. Namely, the guide block 154 is moved in the circumferential direction along the annular rail 152 to turn the cutting blade 18 around the center axis Ax of the sheathed fiber 12. As the guide block 154 moves, the transport jig 158 is driven to transport the cutting blade 18 toward the sheathed fiber 12 at a predetermined transport speed. Then the cutting blade 18 makes an incision increasingly deeper in the sheath of the sheathed fiber 12. The sheathed fiber 12 is cut off when the sheath is sheared and then the optical fiber where an incision has been made is broken.

When cutting the sheathed fiber 12 using the cutting apparatus according to the fourth embodiment, the sheathed fiber 12 is not rotated but the cutting blade 18 is rotated. Because there is no restriction in the number of the rotations of the cutting blade 18, it becomes possible to rotate the cutting blade 18 many times to cut the sheathed fiber 12 and then the sheared edge becomes smoother. In addition, if the transport jig 158 is controlled to move corresponding to the travel distance and rotation number (rotation angle) of the guide block 154, the transport speed of the cutting blade 18 becomes easy to control and accuracy in cutting the optical fiber can be improved.

[Embodiment 5]

Figure 13:
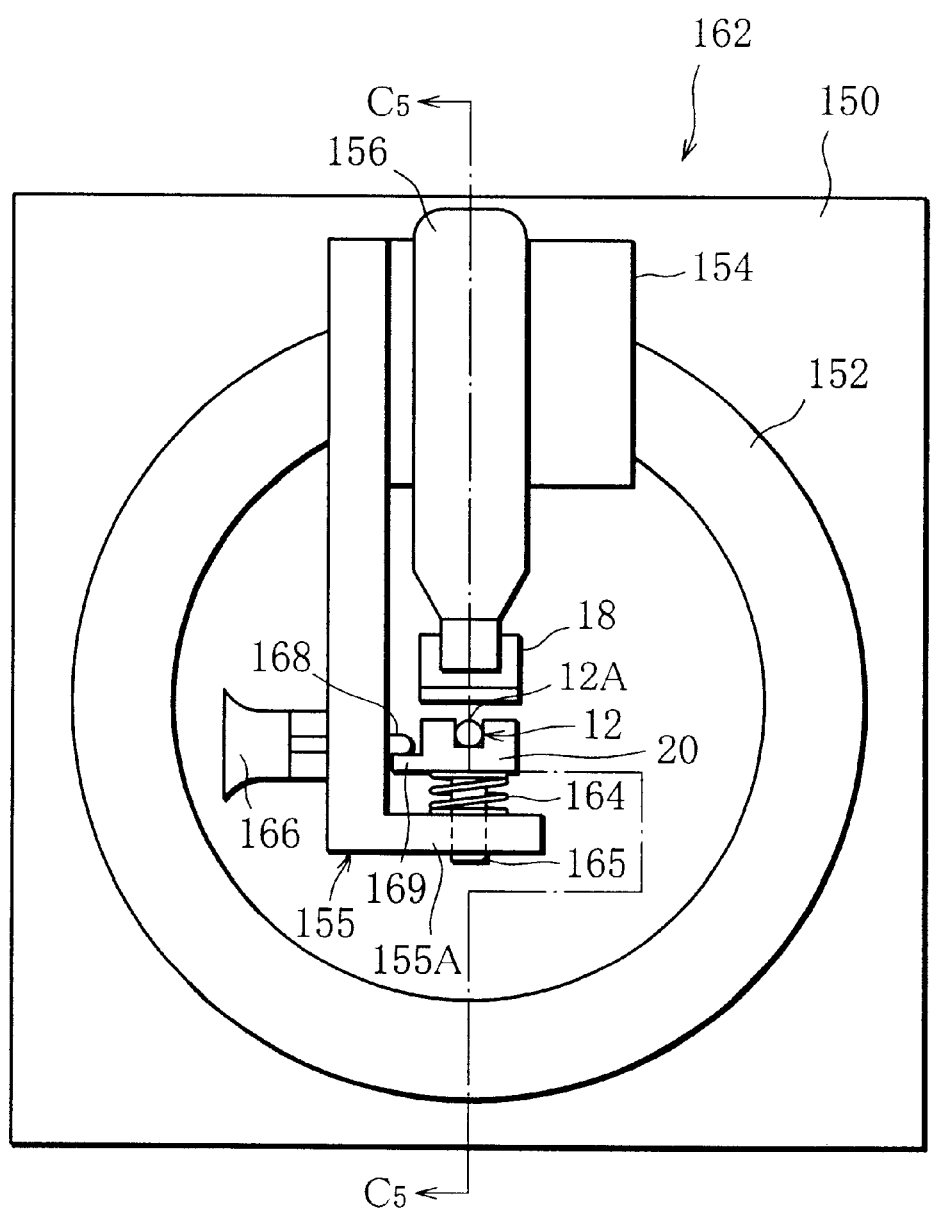
FIG. 13 is a side view illustrating the major constituting parts of the cutting apparatus according to a fifth embodiment of the invention.
Figure 14:
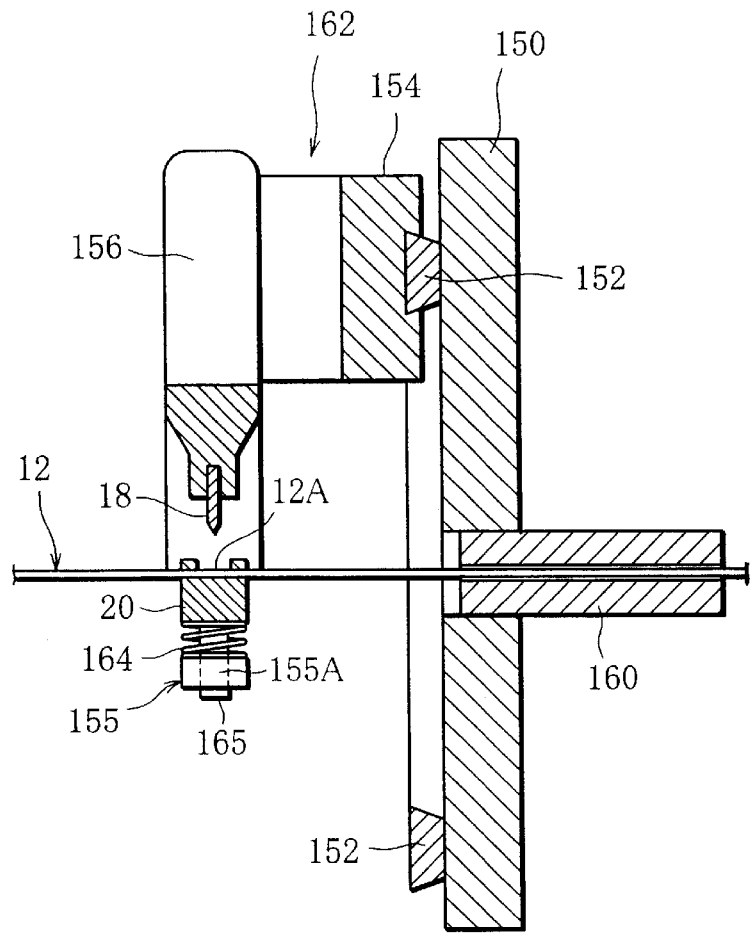
FIG. 14 is a sectional view taken along the C5—C5 line in FIG. 13.
Figure 15:
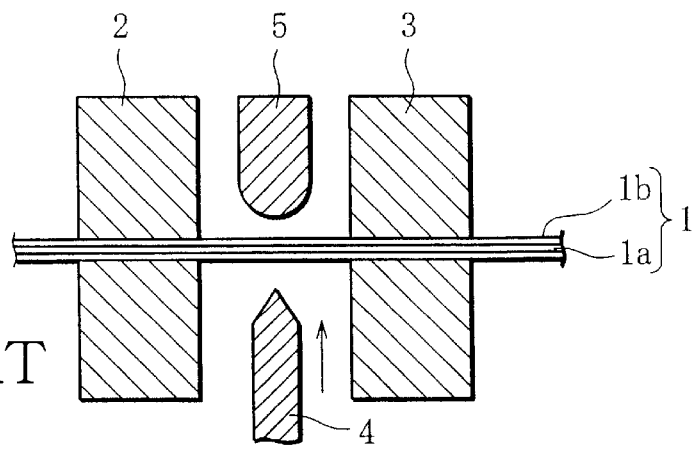
FIG. 15 is a schematic view illustrating a prior-art sheathed optical fiber cutting apparatus.
Figure 16A:
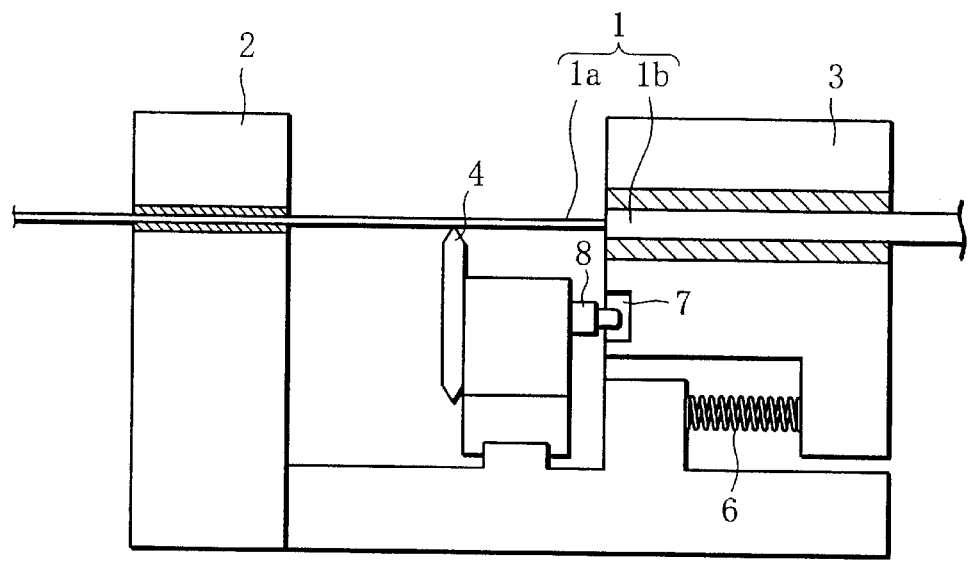
FIG. 16A is a partially sectioned front view.
Figure 16B:
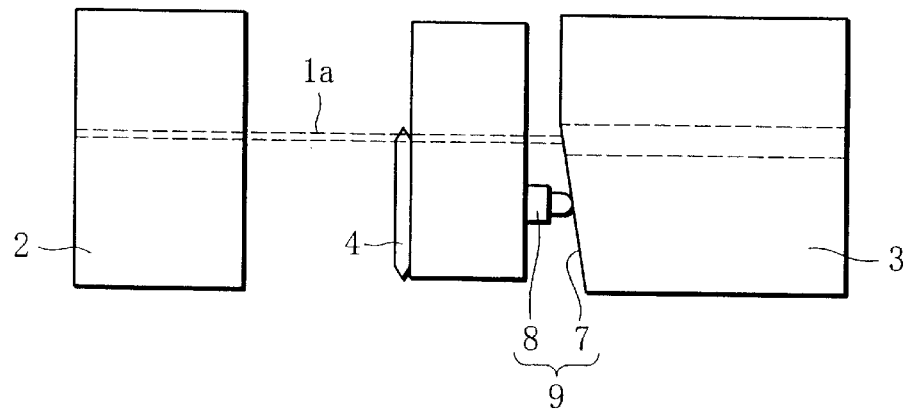
FIG. 16B is a plan view.

The cutting apparatus according to the fifth embodiment is a variation of the cutting apparatus (see FIG. 11 and FIG. 12) according to the fourth embodiment, as shown in FIG. 13 and FIG. 14.

Rotating means 162 has urging means 164 made of, for example, a compression coil spring, between the supporting arm 155 and the blade block 20. The rotating means 162 moves the cutting blade 18 to push it onto the tension-applied surface 12A of the sheathed fiber 12, using the urging force provided by the urging means 164, and makes an incision in the tension-applied surface 12A. Thus the transport jig 158 used in the fourth embodiment is not necessary in the rotating means 162, and the ultrasonic vibrator 156 is directly mounted on the guide block 154.

The blade block 20 has a supporting rod 165 in its lower end. The supporting rod 165, inserted in the urging means 164, holds the urging means 164 and supports the blade block 20 so that it may move up and down with no restriction, penetrating a transverse arm 155A of the supporting arm 155.

In the cutting apparatus according to the fifth embodiment, the sheathed fiber 12 is bent by the urging force provided by the urging means 164 and the tension-applied surface 12A to which a tension is applied by this bending is formed. Thus in the cutting apparatus according to the fifth embodiment, it is not necessary to locate the blade block 20 with a predetermined distance away from the rotation center of the cutting blade 18 to the outer radial direction, different from the cutting apparatus according to the fourth embodiment.

Of course, the blade block 20 may be located away from the cutting center as the case of the fourth embodiment and the sheathed fiber 12 may be curved also in the cutting apparatus according to the fifth embodiment.

Further in the cutting apparatus according to the fifth embodiment, a plunger 166 is mounted in the supporting arm 155 on its side confronting the blade block 20. The plunger 166 moves the operation rod 168 forward to engage its end with an engaging protrusion 169 formed on the side of the blade block 20 to restrict the movement of the blade block 20.

In the cutting apparatus according to the fifth embodiment, therefore, the plunger 166 prevents unintentional failure that the blade block 20 pushes the sheathed fiber 12 with the urging force of the urging means 164 onto the cutting blade 18 and makes an incision on the tension-applied surface 12A when it is not the time to cut the sheathed fiber 12.

Meanwhile, in the cutting apparatus according to the fifth embodiment, when cutting the sheathed fiber 12, the operation rod 168 of the plunger 166 is pulled back to release the engagement of the blade block 20. Then in the cutting apparatus according to the fifth embodiment the blade block 20 moves to the cutting blade 18 driven by the urging force of the urging means 164 to form the tension-applied surface 12A by bending the sheathed fiber 12 and pushes the sheathed fiber 12 onto the cutting blade 18.

As the guide block 154 moves along the annular rail 152, the cutting blade 18 rotates around center axis Ax of the sheathed fiber 12. Then in the cutting apparatus according to the fifth embodiment, the cutting blade 18 is relatively moved toward the center of the sheathed fiber 12 driven by the urging force of the urging means 164 and makes an incision in the tension-applied surface 12A of the sheathed fiber 12 to cut the sheathed fiber 12.

If the cutting blade 18 is moved by the urging means 164 as in the cutting apparatus according to the fifth embodiment, it becomes possible to easily control the movement of the cutting blade 18 based on the adjustment of the urging force of the spring. Then the structure of the urging means 164 becomes simple. In addition, because it also becomes possible to form the tension-applied surface 12A by bending the sheathed fiber 12 using the urging means 164, the structure of the tension providing means becomes simple and the cutting apparatus can be small.

The pushing mechanism 50 employed in the cutting apparatuses according to the first-third embodiments may use various mechanisms utilizing magnets, springs, hydraulic cylinders, cams, and combinations of screws and a motor, as well as weights. When additionally using the tension providing mechanism 52, the tension providing mechanism 52 may use springs, hydraulic cylinders and the likes employed in the pushing mechanism 50, as well as weights and magnets.

In the aforementioned embodiments, the cutting blade is pushed onto the tension-applied surface 12A of the sheathed fiber 12 to make an incision in the sheath of the sheathed fiber 12 and then makes another incision in the optical fiber. Therefore, the moving speed of the cutting blade 18, 102 or the blade block 20 may not be constant; for example, they may move slowly when making an incision in the sheath of the sheathed fiber 12 while they may move fast when making an incision in the optical fiber.

After the cutting blades 18, 102 have been used for a long time, their cutting edges may become dull and chipped, thus it may become difficult to shear the sheathed fiber 12 flat. In such a case, the positions of the cutting blades 18, 102 are shifted by a given length in the direction of blade width, or the blades are replaced by new cutting blades 18, 102, after they have been used as many as predetermined times (including once). It is preferable to push a sharp cutting edge onto the tension-applied surface 12A of the sheathed fiber 12 to make an incision when cutting the sheathed fiber 12.

Industrial Applicabiltiy

According to the sheathed optical fiber cutting methods and cutting apparatus based on the first, second and fourth aspects of the present invention, the incision created in the sheathed fiber broadens from the fiber center side toward the outside radial direction to the tension-applied surface, seen from the transverse direction perpendicular to the optical axis. Then the contact friction between the cutting blade and the incision in the sheathed fiber as well as the compression stress exerted on the sheath of the sheathed fiber and the optical fiber become small. Thus the sheath of the sheathed fiber near the incision does not collapse, or the sheared edge of the sheath or the optical fiber does not become rough. Either the cutting edge of the blade does not slip away from the sheath because of the elasticity of the sheath. Further, since the cutting blade makes an incision in the tension-applied surface of the sheathed fiber by relatively rotating the sheathed fiber around its center axis against the cutting blade, the incision develops uniformly in the tension-applied surface in the circumferential direction, eliminating the problem that when cutting the sheathed fiber the sheath is torn off and the sheared edge becomes rough.

Thus it is possible to cut the sheathed fiber so that the sheared edge is flat and perpendicular to the axial direction in a single step, leaving no step between the sheath and the optical fiber. It also becomes possible to measure the decentering of the sheath of the sheathed fiber and the mode fields such as the refractive index distribution efficiently and accurately in a single step. Further, since the sheath of the sheathed fiber is sheared at an incision and then the optical fiber is cut after an incision has been made, the sheared edge of the sheath becomes flat and the sheared edge of the optical fiber becomes mirror-flat. Therefore, it becomes possible to easily and quickly perform after-treatment like edge polishing; it may be possible to skip after-treatment.

According to the sheathed optical fiber cutting method and cutting apparatus based on the third and fifth aspects of the present invention, it is possible to form an outer surface to which a tension is applied due to fiber bending by gently curving the sheathed fiber with a large radius of curvature. When the sheathed fiber is bent, while being relatively rotated around its center axis against the cutting blade, no excessive torsion is applied to the sheathed fiber and thus there is no damage caused to the sheathed fiber. At the same time, since it becomes easy to rotate and bend the sheathed fiber, the structure of the cutting apparatus becomes simple.

If the cutting blade makes an incision in the tension-applied surface under such a condition that the sheathed fiber is relatively rotated and bent as well as pulled in its axial direction at the same time, the tension applied to the optical fiber gradually increases as the incision made by the cutting blade develops deep. As a result, the incision in the sheathed fiber made by the cutting blade easily widens, and the contact friction between the cutting blade and the incision becomes smaller. At the same time, it becomes possible to make the sheared edges, made by the cutting blade, of the sheath and the optical fiber of the sheathed fiber flat.

According to the sheathed optical fiber cutting apparatus based on the sixth aspect of the present invention, since the friction exerted on the contact face between the cutting blade and the sheathed fiber becomes smaller when cutting the sheathed fiber through making an incision with the cutting blade, it is ensured to provide a flatter sheared edge.

According to the sheathed optical fiber cutting apparatus based on the seventh aspect of the present invention, since it is possible to cut the sheath and the optical fiber under almost ideal condition that fits the materials used in those components, the sheared edge of the sheathed fiber is relatively easily made flat with reliability. Further, since the durability of the cutting blade improves and the life of the cutting blade extends, the cutting apparatus becomes economically available. In addition, since the interval for replacing the cutting blade with a new one is extended, the downtime of the cutting apparatus is shortened and its maintenance becomes easy.

What is claimed is:

1. A sheathed optical fiber cutting method for cutting the sheathed optical fiber, the method comprising:

rotating the sheathed optical fiber around its center axis against a cutting blade; and making an incision in an area having a bent curvature, wherein the incision area is under tension from the optitcal fiber being bent.

2. The sheathed optical fiber cutting method according to claim 1, wherein the sheath of said sheathed optical fiber is sheared and then the optical fiber where an incision has been made is cut.

3. The sheathed optical fiber cutting method according to claim 1 or 2, wherein the cutting blade makes an incision in said tension-applied surface under such a condition that said sheathed optical fiber is pulled in its axial direction.

4. The method of claim 1, wherein the incision provides a cut edge to the optical fiber that is flat and perpendicular to the axial direction.

5. The method of claim 1, wherein the incision provides a cut edge to the optical fiber that is flat and perpendicular to the axial direction.

6. A sheathed optical fiber cutting apparatus comprising:

a clamp part that holds a sheathed optical fiber;

a cutting blade that makes an incision toward the center of the sheathed optical fiber;

a blade block that is located against said cutting blade beyond said sheathed optical fiber and supports said sheathed optical fiber where an incision will be made by said cutting blade;

tension providing means for forming in the sheathed optical fiber a tension-applied surface to which a tension due to fiber binding is applied by pushing said blade block onto said sheathed optical fiber and having a mechanism of pushing said tension-applied surface onto said cutting blade; and rotating means for rotating said sheathed optical fiber around its center axis against the cutting blade.

7. The sheathed optical fiber cutting apparatus according to claim 4, wherein said tension providing means further has a tension providing mechanism for providing additional tension to the tension-applied surface of said sheathed optical fiber by pulling said sheathed optical fiber in its axial direction in order to gradually increase the tension applied to said sheathed optical fiber as the incision made by the cutting blade becomes deeper.

8. The sheathed optical fiber cutting apparatus according to claim 6 or 7, wherein said cutting blade is mounted in vibration generating means for vibrating in a radial direction of said sheathed optical fiber.

9. The sheathed optical fiber cutting apparatus according to claim 6, wherein said cutting blade comprises a first cutting blade for cutting the sheath of said sheathed optical fiber and a second cutting blade for cutting the optical fiber, and said first and second cutting blades are mounted in a cutting blade exchange guide so that they may shuttle between an operation position for cutting the sheath of said sheathed optical fiber or the optical fiber and a position for standby.

\* \* \* \* \*